(12) United States Patent
Hewitt et al.

(10) Patent No.: US 12,446,891 B2
(45) Date of Patent: Oct. 21, 2025

(54) DEVICES FOR TREATMENT OF VASCULAR DEFECTS

(71) Applicant: MICROVENTION, INC., Aliso Viejo, CA (US)

(72) Inventors: Todd Hewitt, Laguna Niguel, CA (US); Parker Milhous, Santa Ana, CA (US); Hung P. Tran, Midway City, CA (US); John Vu, Santa Ana, CA (US)

(73) Assignee: MICROVENTION, INC., Aliso Viejo, CA (US)

( * ) Notice: Subject to any disclaimer, the term of this patent is extended or adjusted under 35 U.S.C. 154(b) by 220 days.

(21) Appl. No.: 17/896,620

(22) Filed: Aug. 26, 2022

(65) Prior Publication Data

US 2023/0114169 A1    Apr. 13, 2023

Related U.S. Application Data

(60) Provisional application No. 63/239,122, filed on Aug. 31, 2021, provisional application No. 63/238,402, (Continued)

(51) Int. Cl.
*A61B 17/12* (2006.01)

(52) U.S. Cl.
CPC .. *A61B 17/12172* (2013.01); *A61B 17/12113* (2013.01)

(58) Field of Classification Search
CPC ........ A61B 17/12172; A61B 17/12113; A61B 2017/00898; A61B 2017/1205;
(Continued)

(56) References Cited

U.S. PATENT DOCUMENTS

| | | |
|---|---|---|
| 3,874,388 A | 4/1975 | King et al. |
| 4,282,875 A | 8/1981 | Serbinenko |

(Continued)

FOREIGN PATENT DOCUMENTS

| | | |
|---|---|---|
| AU | 2009242528 | 3/2016 |
| CA | 2722037 | 10/2009 |

(Continued)

OTHER PUBLICATIONS

A Complete Microcatheter Portfolio; A Broad Selection of Microcatheters. Boston Scientific Brochure 2007.

(Continued)

*Primary Examiner* — Richard G Louis
(74) *Attorney, Agent, or Firm* — ONE LLP

(57) ABSTRACT

Devices and methods for treatment of a patient's vasculature are described. Embodiments may include a permeable implant having a radially constrained state configured for delivery within a catheter lumen, an expanded state, and a plurality of elongate filaments that are woven together. The implant may include a cavity in a proximal section that may optionally house embolic material, such as coils. Alternatively, the implant may have an expanded preset shape that is different than an expanded preset shape that is assumed after deployment in an aneurysm. The expanded preset shape may be frustoconical. Alternatively, the implant may include an outer skirt coupled to a proximal section of the permeable implant.

8 Claims, 17 Drawing Sheets

Related U.S. Application Data filed on Aug. 30, 2021, provisional application No. 63/238,434, filed on Aug. 30, 2021.

(58) Field of Classification Search
CPC ........ A61B 2090/3966; A61B 17/1214; A61B 17/12177
See application file for complete search history.

(56) References Cited

U.S. PATENT DOCUMENTS

| | | |
|---|---|---|
| 4,346,712 A | 8/1982 | Handa et al. |
| 4,402,319 A | 9/1983 | Handa et al. |
| 4,619,246 A | 10/1986 | Molgaard-Nielsen et al. |
| 4,675,361 A | 6/1987 | Ward |
| 4,729,278 A | 3/1988 | Graeff |
| 4,998,539 A | 3/1991 | Delsanti |
| 5,061,275 A | 10/1991 | Wallsten et al. |
| 5,071,407 A | 12/1991 | Termin et al. |
| 5,108,407 A | 4/1992 | Geremia et al. |
| 5,122,136 A | 6/1992 | Gluglielmi et al. |
| 5,154,705 A | 10/1992 | Fleischhacker et al. |
| 5,158,545 A | 10/1992 | Trudell et al. |
| 5,165,421 A | 11/1992 | Fleischhacker et al. |
| 5,263,963 A | 11/1993 | Garrison |
| 5,334,210 A | 8/1994 | Gianturco |
| 5,378,239 A | 1/1995 | Termin |
| 5,536,247 A | 7/1996 | Thornton |
| 5,562,725 A | 10/1996 | Schmitt et al. |
| 5,569,245 A | 10/1996 | Gluglielmi et al. |
| 5,578,074 A | 11/1996 | Mirigian |
| 5,591,222 A | 1/1997 | Susawa et al. |
| 5,601,595 A | 2/1997 | Smith |
| 5,630,840 A | 5/1997 | Mayer |
| D380,266 S | 6/1997 | Boatman et al. |
| 5,645,559 A | 7/1997 | Hachtman et al. |
| 5,725,552 A | 3/1998 | Kotula |
| 5,725,570 A | 3/1998 | Heath |
| 5,733,294 A | 3/1998 | Forber |
| 5,749,883 A | 5/1998 | Halpern |
| 5,759,161 A | 6/1998 | Ogawa |
| 5,766,219 A | 6/1998 | Horton |
| 5,846,261 A | 12/1998 | Kotula et al. |
| 5,873,907 A | 2/1999 | Frantzen |
| 5,907,893 A | 6/1999 | Zadno-Azizi |
| 5,916,235 A | 6/1999 | Guglielmi |
| 5,925,060 A | 7/1999 | Forber |
| 5,927,345 A | 7/1999 | Samson |
| 5,928,260 A | 7/1999 | Chin et al. |
| 5,935,148 A | 8/1999 | Villar et al. |
| 5,944,733 A | 8/1999 | Engelson |
| 5,944,738 A | 8/1999 | Amplatz |
| 5,951,599 A | 9/1999 | McCrory |
| 5,964,797 A | 10/1999 | Ho |
| 5,980,554 A | 11/1999 | Lenker et al. |
| 5,984,929 A | 11/1999 | Bashiri et al. |
| 5,989,242 A | 11/1999 | Saadat et al. |
| 6,033,423 A | 3/2000 | Ken et al. |
| 6,063,070 A | 5/2000 | Eder |
| 6,063,104 A | 5/2000 | Villar et al. |
| 6,086,577 A | 7/2000 | Ken et al. |
| 6,093,199 A | 7/2000 | Brown et al. |
| 6,123,715 A | 9/2000 | Amplatz |
| 6,139,564 A | 10/2000 | Teoh et al. |
| 6,142,975 A | 11/2000 | Jalisi et al. |
| 6,152,144 A | 11/2000 | Lesh et al. |
| 6,156,061 A | 12/2000 | Wallace et al. |
| 6,159,206 A | 12/2000 | Ogawa |
| 6,168,615 B1 | 1/2001 | Ken et al. |
| 6,168,618 B1 | 1/2001 | Frantzen |
| 6,168,622 B1 | 1/2001 | Mazzocchi |
| 6,190,402 B1 | 2/2001 | Horton et al. |
| 6,193,708 B1 | 2/2001 | Ken et al. |
| 6,203,779 B1 | 3/2001 | Ricci et al. |
| 6,221,086 B1 | 4/2001 | Forber |
| 6,238,403 B1 | 5/2001 | Greene, Jr. et al. |
| 6,277,126 B1 | 8/2001 | Barry et al. |
| 6,290,721 B1 | 9/2001 | Heath |
| 6,315,709 B1 | 11/2001 | Garibaldi et al. |
| 6,325,815 B1 | 12/2001 | Kusleika |
| 6,342,068 B1 | 1/2002 | Thompson |
| 6,344,048 B1 | 2/2002 | Chin et al. |
| 6,346,117 B1 | 2/2002 | Greenhalgh |
| 6,350,270 B1 | 2/2002 | Roue |
| 6,368,338 B1 | 4/2002 | Konya |
| 6,368,339 B1 | 4/2002 | Amplatz |
| 6,375,668 B1 | 4/2002 | Gifford |
| 6,375,670 B1 | 4/2002 | Greenhalgh |
| 6,383,174 B1 | 5/2002 | Eder |
| 6,391,037 B1 | 5/2002 | Greenhalgh |
| 6,425,914 B1 | 7/2002 | Wallace et al. |
| 6,428,558 B1 | 8/2002 | Jones et al. |
| 6,447,531 B1 | 9/2002 | Amplatz |
| 6,454,780 B1 | 9/2002 | Wallace |
| 6,461,370 B1 | 10/2002 | Gray et al. |
| 6,463,317 B1 | 10/2002 | Kucharczyk |
| 6,468,266 B1 | 10/2002 | Bashiri et al. |
| 6,478,773 B1 | 11/2002 | Gandhi et al. |
| 6,500,149 B2 | 12/2002 | Gandhi et al. |
| 6,506,204 B2 | 1/2003 | Mazzocchi |
| 6,511,468 B1 | 1/2003 | Cragg et al. |
| 6,551,303 B1 | 4/2003 | Van Tassel et al. |
| 6,579,303 B2 | 6/2003 | Amplatz |
| 6,585,748 B1 | 7/2003 | Jeffree |
| 6,589,256 B2 | 7/2003 | Forber |
| 6,589,265 B1 | 7/2003 | Palmer et al. |
| 6,599,308 B2 | 7/2003 | Amplatz |
| 6,605,102 B1 | 8/2003 | Mazzocchi et al. |
| 6,605,111 B2 | 8/2003 | Bose et al. |
| 6,607,539 B1 | 8/2003 | Hayashi et al. |
| 6,613,074 B1 | 9/2003 | Mitelberg |
| 6,626,939 B1 | 9/2003 | Burnside et al. |
| 6,632,241 B1 | 10/2003 | Hancock |
| 6,635,068 B1 | 10/2003 | Dubrul et al. |
| 6,638,257 B2 | 10/2003 | Amplatz |
| 6,652,556 B1 | 11/2003 | Tassel et al. |
| 6,666,882 B1 | 12/2003 | Bose et al. |
| 6,669,721 B1 | 12/2003 | Bose et al. |
| 6,682,546 B2 | 1/2004 | Amplatz |
| 6,689,150 B1 | 2/2004 | Tassel |
| 6,689,486 B2 | 2/2004 | Ho et al. |
| 6,719,778 B1 | 4/2004 | Van Tassel et al. |
| 6,730,118 B2 | 5/2004 | Spenser et al. |
| 6,730,119 B1 | 5/2004 | Smalling |
| 6,743,236 B2 | 6/2004 | Barry et al. |
| 6,743,251 B1 | 6/2004 | Eder |
| 6,746,468 B1 | 6/2004 | Sepetka et al. |
| 6,746,890 B2 | 6/2004 | Gupta et al. |
| 6,752,826 B2 | 6/2004 | Holloway et al. |
| 6,780,196 B2 | 8/2004 | Chin et al. |
| 6,811,560 B2 | 11/2004 | Jones et al. |
| 6,818,006 B2 | 11/2004 | Douk et al. |
| 6,855,153 B2 | 2/2005 | Saadat |
| 6,855,154 B2 | 2/2005 | Abdel-Gawwad |
| 6,878,384 B2 | 4/2005 | Cruise et al. |
| 6,936,055 B1 | 8/2005 | Ken et al. |
| 6,940,209 B2 | 9/2005 | Henderson |
| 6,953,472 B2 | 10/2005 | Palmer et al. |
| 6,953,473 B2 | 10/2005 | Porter |
| 6,966,892 B2 | 11/2005 | Gandhi et al. |
| 6,994,092 B2 | 2/2006 | van der Burg et al. |
| 7,001,409 B2 | 2/2006 | Amplatz |
| 7,004,962 B2 | 2/2006 | Stinson |
| 7,011,671 B2 | 3/2006 | Welch |
| 7,044,958 B2 | 5/2006 | Douk et al. |
| 7,052,513 B2 | 5/2006 | Thompson |
| 7,083,632 B2 | 8/2006 | Avellanet et al. |
| 7,101,390 B2 | 9/2006 | Nelson |
| 7,122,043 B2 | 10/2006 | Greenhalgh et al. |
| 7,128,736 B1 | 10/2006 | Abrams et al. |
| 7,179,276 B2 | 2/2007 | Barry et al. |
| 7,182,774 B2 | 2/2007 | Barry et al. |
| 7,195,636 B2 | 3/2007 | Avellanet et al. |
| 7,198,613 B2 | 4/2007 | Gandhi et al. |
| 7,201,918 B2 | 4/2007 | Cruise |

(56) References Cited

U.S. PATENT DOCUMENTS

| | | |
|---|---|---|
| 7,229,454 B2 | 6/2007 | Tran |
| 7,229,461 B2 | 6/2007 | Chin et al. |
| 7,275,471 B2 | 10/2007 | Nishri et al. |
| 7,326,225 B2 | 2/2008 | Ferrera et al. |
| 7,329,279 B2 | 2/2008 | Haug et al. |
| 7,331,980 B2 | 2/2008 | Dubrul |
| 7,410,482 B2 | 8/2008 | Murphy |
| 7,419,503 B2 | 9/2008 | Pulnev et al. |
| 7,490,396 B2 | 2/2009 | Bradley |
| 7,524,319 B2 | 4/2009 | Dubrul |
| 7,569,066 B2 | 8/2009 | Gerberding |
| 7,573,382 B2 | 8/2009 | Choubey et al. |
| 7,575,582 B2 | 8/2009 | Gandhi et al. |
| 7,578,826 B2 | 8/2009 | Gandhi et al. |
| 7,597,704 B2 | 10/2009 | Frazier et al. |
| 7,648,532 B2 | 1/2010 | Greenhalgh et al. |
| 7,695,488 B2 | 4/2010 | Berenstein |
| 7,722,637 B2 | 5/2010 | Barry et al. |
| 7,745,732 B2 | 6/2010 | Michael et al. |
| 7,806,919 B2 | 10/2010 | Bloom et al. |
| 7,862,577 B2 | 1/2011 | Gray et al. |
| 7,942,925 B2 | 5/2011 | Yodaf |
| 7,989,703 B2 | 8/2011 | Schaffer |
| 8,043,326 B2 | 10/2011 | Hancock |
| 8,043,329 B2 | 10/2011 | Khairkhahan |
| 8,066,757 B2 | 11/2011 | Ferrera et al. |
| 8,142,456 B2 | 3/2012 | Rosqueta et al. |
| 8,182,506 B2 | 5/2012 | Fitz et al. |
| 8,192,480 B2 | 6/2012 | Tieu et al. |
| 8,261,648 B1 | 9/2012 | Marchand et al. |
| 8,313,505 B2 | 11/2012 | Amplatz et al. |
| 8,377,091 B2 | 2/2013 | Cruise et al. |
| 8,398,670 B2 | 3/2013 | Amplatz |
| 8,430,012 B1 | 4/2013 | Marchand |
| 8,506,619 B2 | 8/2013 | Ortiz et al. |
| 8,551,132 B2 | 10/2013 | Eskridge et al. |
| 8,597,320 B2 | 12/2013 | Sepetka |
| 8,597,323 B1 | 12/2013 | Plaza et al. |
| 8,690,907 B1 | 4/2014 | Janardhan et al. |
| 8,715,338 B2 | 5/2014 | Frid |
| 8,728,117 B1 | 5/2014 | Janardhan et al. |
| 8,747,430 B2 | 6/2014 | Porter |
| 8,758,395 B2 | 6/2014 | Kleshinski et al. |
| 8,795,330 B1 | 8/2014 | Janardhan et al. |
| 8,826,791 B2 | 9/2014 | Thompson et al. |
| 8,840,735 B2 | 9/2014 | Schaffer |
| 8,845,679 B1 | 9/2014 | Janardhan et al. |
| 9,078,658 B2 | 7/2015 | Hewitt et al. |
| 9,161,758 B2 | 10/2015 | Figulla et al. |
| 9,198,668 B2 | 12/2015 | Theobald et al. |
| 9,198,670 B2 | 12/2015 | Hewitt et al. |
| 9,259,337 B2 | 2/2016 | Cox et al. |
| 9,272,323 B2 | 3/2016 | Schaffer |
| 9,295,473 B2 | 3/2016 | Hewitt et al. |
| 9,351,715 B2 | 5/2016 | Mach |
| 9,492,174 B2 | 11/2016 | Hewitt et al. |
| 9,504,588 B2 | 11/2016 | Sadisivan et al. |
| 9,585,669 B2 | 3/2017 | Becking et al. |
| 9,597,087 B2 | 3/2017 | Marchand et al. |
| 9,629,635 B2 | 4/2017 | Hewitt et al. |
| 9,687,245 B2 | 6/2017 | Molaei et al. |
| 9,855,047 B2 | 1/2018 | Berez et al. |
| 9,955,976 B2 | 5/2018 | Hewitt et al. |
| 10,123,803 B2 | 11/2018 | Ferrera et al. |
| 10,130,372 B2 | 11/2018 | Griffin |
| 10,136,896 B2 | 11/2018 | Hewitt et al. |
| 10,238,393 B2 | 3/2019 | Marchand et al. |
| 10,260,182 B2 | 4/2019 | Thompson et al. |
| 10,260,183 B2 | 4/2019 | Marchand et al. |
| 10,398,441 B2 | 9/2019 | Warner et al. |
| 10,426,589 B2 | 10/2019 | Van der Burg et al. |
| 10,470,773 B2 | 11/2019 | Maguire et al. |
| 10,499,925 B2 | 12/2019 | Cruise et al. |
| 10,617,426 B2 | 4/2020 | Aboytes et al. |
| 10,716,573 B2 | 7/2020 | Connor |
| 10,736,758 B2 | 8/2020 | Ruvalcaba et al. |
| 10,813,645 B2 | 10/2020 | Hewitt et al. |
| 10,856,880 B1 | 12/2020 | Badruddin et al. |
| 10,939,914 B2 | 3/2021 | Hewitt et al. |
| 10,952,739 B2 | 3/2021 | Plaza et al. |
| 11,033,277 B2 | 6/2021 | Wolfe et al. |
| 11,058,431 B2 | 7/2021 | Pereira et al. |
| 11,185,335 B2 | 11/2021 | Badruddin et al. |
| 11,202,636 B2 | 12/2021 | Zaidat et al. |
| 11,284,901 B2 | 3/2022 | Griffin |
| 11,317,921 B2 | 5/2022 | Hewitt et al. |
| 11,389,174 B2 | 7/2022 | Griffin |
| 11,464,518 B2 | 10/2022 | Connor |
| 11,559,309 B2 | 1/2023 | Rangwala et al. |
| 11,723,667 B2 | 8/2023 | Hewitt et al. |
| 11,786,253 B2 | 10/2023 | Divino et al. |
| 2001/0031981 A1 | 10/2001 | Evans et al. |
| 2002/0065552 A1 | 5/2002 | Jayaraman et al. |
| 2002/0103542 A1 | 8/2002 | Bilbo |
| 2002/0111647 A1 | 8/2002 | Khairkhahan et al. |
| 2002/0143349 A1 | 10/2002 | Gifford, III et al. |
| 2002/0143361 A1 | 10/2002 | Douk et al. |
| 2002/0156499 A1 | 10/2002 | Konya et al. |
| 2002/0169473 A1 | 11/2002 | Sepetka et al. |
| 2002/0183787 A1 | 12/2002 | Wahr et al. |
| 2002/0187288 A1 | 12/2002 | Lim et al. |
| 2003/0012816 A1 | 1/2003 | West et al. |
| 2003/0028209 A1 | 2/2003 | Teoh et al. |
| 2003/0040771 A1 | 2/2003 | Hyodoh et al. |
| 2003/0167068 A1 | 9/2003 | Amplatz |
| 2003/0171739 A1 | 9/2003 | Murphy et al. |
| 2003/0171774 A1 | 9/2003 | Freudenthal et al. |
| 2003/0181942 A1 | 9/2003 | Sutton et al. |
| 2003/0187473 A1 | 10/2003 | Berenstein et al. |
| 2003/0199913 A1 | 10/2003 | Dubrul et al. |
| 2004/0059370 A1 | 3/2004 | Green, Jr. et al. |
| 2004/0098027 A1 | 5/2004 | Tech et al. |
| 2004/0111147 A1 | 6/2004 | Rabkin et al. |
| 2004/0122367 A1 | 6/2004 | Sculati et al. |
| 2004/0143239 A1 | 7/2004 | Zhou et al. |
| 2004/0158311 A1 | 8/2004 | Berhow |
| 2004/0172053 A1 | 9/2004 | Barry et al. |
| 2004/0186562 A1 | 9/2004 | Cox |
| 2004/0193206 A1 | 9/2004 | Gerberding et al. |
| 2004/0193208 A1 | 9/2004 | Talpade et al. |
| 2004/0220563 A1 | 11/2004 | Eder |
| 2004/0260333 A1 | 12/2004 | Dubrul et al. |
| 2005/0021075 A1 | 1/2005 | Bonnette et al. |
| 2005/0033408 A1 | 2/2005 | Jones et al. |
| 2005/0053782 A1 | 3/2005 | Sen et al. |
| 2005/0096728 A1 | 5/2005 | Ramer |
| 2005/0112349 A1 | 5/2005 | Laurencin et al. |
| 2005/0113861 A1 | 5/2005 | Corcoran et al. |
| 2005/0113868 A1 | 5/2005 | Devellian et al. |
| 2005/0119684 A1 | 6/2005 | Gutterman et al. |
| 2005/0133046 A1 | 6/2005 | Becker et al. |
| 2005/0137623 A1 | 6/2005 | Jones et al. |
| 2005/0149173 A1 | 7/2005 | Hunter et al. |
| 2005/0216052 A1 | 9/2005 | Mazzocchi et al. |
| 2005/0222489 A1 | 10/2005 | Rahdert et al. |
| 2005/0228422 A1 | 10/2005 | Machold et al. |
| 2005/0228434 A1 | 10/2005 | Amplatz et al. |
| 2005/0267516 A1 | 12/2005 | Soleimani et al. |
| 2005/0277978 A1 | 12/2005 | Greenhalgh |
| 2006/0009798 A1 | 1/2006 | Callister et al. |
| 2006/0009799 A1 | 1/2006 | Kleshinski et al. |
| 2006/0009800 A1 | 1/2006 | Christianson et al. |
| 2006/0052815 A1 | 3/2006 | Fitz et al. |
| 2006/0052816 A1 | 3/2006 | Bates et al. |
| 2006/0064151 A1 | 3/2006 | Guterman et al. |
| 2006/0083721 A1 | 4/2006 | Cohen et al. |
| 2006/0106421 A1 | 5/2006 | Teoh |
| 2006/0116708 A1 | 6/2006 | Ogawa et al. |
| 2006/0135947 A1 | 6/2006 | Soltesz et al. |
| 2006/0155323 A1 | 7/2006 | Porter et al. |
| 2006/0178694 A1 | 8/2006 | Greenhalgh et al. |
| 2006/0200192 A1 | 9/2006 | Fitz et al. |
| 2006/0200234 A1 | 9/2006 | Hines |
| 2006/0212055 A1 | 9/2006 | Karabey et al. |

(56) References Cited

U.S. PATENT DOCUMENTS

| | | |
|---|---|---|
| 2006/0217799 A1 | 9/2006 | Mailander et al. |
| 2006/0235464 A1 | 10/2006 | Avellanet et al. |
| 2006/0247680 A1 | 11/2006 | Amplatz et al. |
| 2006/0252984 A1 | 11/2006 | Rahdert et al. |
| 2006/0253149 A1 | 11/2006 | Gandhi et al. |
| 2006/0271086 A1 | 11/2006 | Ramzipoor et al. |
| 2007/0021816 A1 | 1/2007 | Rudin |
| 2007/0031584 A1 | 2/2007 | Roth |
| 2007/0061006 A1 | 3/2007 | Desatnik et al. |
| 2007/0088387 A1 | 4/2007 | Eskridge et al. |
| 2007/0100419 A1 | 5/2007 | Licata et al. |
| 2007/0106311 A1 | 5/2007 | Wallace et al. |
| 2007/0106323 A1 | 5/2007 | Barry et al. |
| 2007/0112380 A1 | 5/2007 | Figulla et al. |
| 2007/0142906 A1 | 6/2007 | Figulla et al. |
| 2007/0144124 A1 | 6/2007 | Schewe et al. |
| 2007/0167911 A1 | 7/2007 | Gandhi et al. |
| 2007/0167980 A1 | 7/2007 | Figulla et al. |
| 2007/0173928 A1 | 7/2007 | Morsi |
| 2007/0203062 A1 | 8/2007 | Ellis-Behnke et al. |
| 2007/0208373 A1 | 9/2007 | Zaver et al. |
| 2007/0208376 A1 | 9/2007 | Meng |
| 2007/0225760 A1 | 9/2007 | Moszner et al. |
| 2007/0233186 A1 | 10/2007 | Meng |
| 2007/0255388 A1 | 11/2007 | Rudakov et al. |
| 2007/0265656 A1 | 11/2007 | Amplatz et al. |
| 2007/0288083 A1 | 12/2007 | Hines |
| 2007/0299464 A1 | 12/2007 | Cruise et al. |
| 2008/0033341 A1 | 2/2008 | Grad |
| 2008/0033366 A1 | 2/2008 | Matson |
| 2008/0033475 A1 | 2/2008 | Meng |
| 2008/0033478 A1 | 2/2008 | Meng |
| 2008/0097495 A1 | 4/2008 | Feller, III et al. |
| 2008/0119886 A1 | 5/2008 | Greenhalgh et al. |
| 2008/0161936 A1 | 7/2008 | Feller et al. |
| 2008/0188923 A1 | 8/2008 | Chu |
| 2008/0195139 A1 | 8/2008 | Donald et al. |
| 2008/0200945 A1* | 8/2008 | Amplatz ............ A61B 17/0057 606/213 |
| 2008/0221600 A1 | 9/2008 | Dieck et al. |
| 2008/0228215 A1 | 9/2008 | Strauss et al. |
| 2008/0281350 A1 | 11/2008 | Sepetka et al. |
| 2009/0025820 A1 | 1/2009 | Adams |
| 2009/0062812 A1 | 3/2009 | Fitz et al. |
| 2009/0062834 A1 | 3/2009 | Moftakhar |
| 2009/0062841 A1 | 3/2009 | Amplatz et al. |
| 2009/0082803 A1 | 3/2009 | Adams et al. |
| 2009/0099647 A1 | 4/2009 | Glimsdale et al. |
| 2009/0112305 A1 | 4/2009 | Goldmann et al. |
| 2009/0132024 A1 | 5/2009 | Berkhoff |
| 2009/0163780 A1 | 6/2009 | Tieu |
| 2009/0227976 A1 | 9/2009 | Calabria |
| 2009/0275974 A1 | 11/2009 | Marchand |
| 2009/0287291 A1 | 11/2009 | Becking et al. |
| 2009/0287294 A1 | 11/2009 | Rosqueta et al. |
| 2009/0318948 A1 | 12/2009 | Linder et al. |
| 2010/0004679 A1 | 1/2010 | Osypka |
| 2010/0023048 A1 | 1/2010 | Mach |
| 2010/0023105 A1 | 1/2010 | Levy et al. |
| 2010/0069948 A1 | 3/2010 | Veznedaroglu et al. |
| 2010/0094409 A1 | 4/2010 | Barker et al. |
| 2010/0106235 A1 | 4/2010 | Kariniemi et al. |
| 2010/0262182 A1 | 10/2010 | Moszner et al. |
| 2011/0022149 A1 | 1/2011 | Cox |
| 2011/0029008 A1 | 2/2011 | Gesswein |
| 2011/0046658 A1 | 2/2011 | Connor et al. |
| 2011/0046719 A1 | 2/2011 | Frid |
| 2011/0054515 A1 | 3/2011 | Bridgeman |
| 2011/0082493 A1 | 4/2011 | Samson et al. |
| 2011/0144669 A1 | 6/2011 | Becking et al. |
| 2011/0152823 A1 | 6/2011 | Mohiuddin et al. |
| 2011/0152993 A1* | 6/2011 | Marchand ........ A61B 17/12113 623/1.2 |
| 2011/0202085 A1 | 8/2011 | Loganathan et al. |
| 2011/0208227 A1 | 8/2011 | Becking |
| 2011/0208233 A1 | 8/2011 | McGuckin |
| 2011/0224776 A1 | 9/2011 | Sepekta et al. |
| 2011/0295298 A1 | 12/2011 | Moszner |
| 2011/0319926 A1 | 12/2011 | Becking |
| 2012/0065667 A1 | 3/2012 | Javois et al. |
| 2012/0143237 A1 | 6/2012 | Cam |
| 2012/0165919 A1 | 6/2012 | Cox et al. |
| 2012/0197283 A1 | 8/2012 | Marchand et al. |
| 2012/0271337 A1* | 10/2012 | Figulla ............ A61B 17/12168 87/9 |
| 2012/0283768 A1 | 11/2012 | Cox et al. |
| 2012/0330341 A1 | 12/2012 | Becking et al. |
| 2013/0066357 A1 | 3/2013 | Aboytes et al. |
| 2013/0092012 A1 | 4/2013 | Marchand et al. |
| 2013/0092013 A1 | 4/2013 | Thompson et al. |
| 2013/0116722 A1 | 5/2013 | Aboytes et al. |
| 2013/0123830 A1 | 5/2013 | Becking et al. |
| 2013/0211495 A1 | 8/2013 | Halden et al. |
| 2013/0233160 A1 | 9/2013 | Marchand et al. |
| 2013/0239790 A1 | 9/2013 | Thompson et al. |
| 2013/0245667 A1 | 9/2013 | Marchand et al. |
| 2013/0268053 A1 | 10/2013 | Molaei et al. |
| 2013/0274862 A1 | 10/2013 | Cox et al. |
| 2013/0274863 A1 | 10/2013 | Cox et al. |
| 2013/0274866 A1 | 10/2013 | Cox et al. |
| 2013/0274868 A1 | 10/2013 | Cox et al. |
| 2013/0296912 A1 | 11/2013 | Ottma |
| 2013/0325051 A1 | 12/2013 | Martin et al. |
| 2014/0005713 A1 | 1/2014 | Bowman et al. |
| 2014/0005714 A1 | 1/2014 | Quick et al. |
| 2014/0018841 A1 | 1/2014 | Peiffer et al. |
| 2014/0052233 A1 | 2/2014 | Cox et al. |
| 2014/0058436 A1 | 2/2014 | Rosenbluth et al. |
| 2014/0074151 A1 | 3/2014 | Tischler et al. |
| 2014/0135734 A1 | 5/2014 | Dakin et al. |
| 2014/0135817 A1 | 5/2014 | Tischler et al. |
| 2014/0135827 A1 | 5/2014 | Amplatz et al. |
| 2014/0142611 A1 | 5/2014 | Plaza et al. |
| 2014/0172001 A1 | 6/2014 | Becking et al. |
| 2014/0200607 A1 | 7/2014 | Sepetka et al. |
| 2014/0257360 A1* | 9/2014 | Keillor ............ A61B 17/12172 606/198 |
| 2014/0257361 A1 | 9/2014 | Prom |
| 2014/0318354 A1 | 10/2014 | Thompson et al. |
| 2014/0318355 A1 | 10/2014 | Marchand et al. |
| 2014/0330299 A1 | 11/2014 | Rosenbluth et al. |
| 2014/0358178 A1 | 12/2014 | Hewitt et al. |
| 2015/0012033 A1 | 1/2015 | Plaza et al. |
| 2015/0133989 A1 | 5/2015 | Lubock et al. |
| 2015/0182674 A1 | 7/2015 | Schaffer |
| 2015/0272589 A1 | 10/2015 | Lorenzo |
| 2015/0283363 A1 | 10/2015 | Hewitt et al. |
| 2015/0313605 A1 | 11/2015 | Griffin |
| 2015/0374483 A1 | 12/2015 | Janardhan et al. |
| 2016/0015396 A1 | 1/2016 | Cox et al. |
| 2016/0015398 A1 | 1/2016 | Hewitt et al. |
| 2016/0030052 A1 | 2/2016 | Cragg et al. |
| 2016/0045201 A1 | 2/2016 | Rosenbluth et al. |
| 2016/0100842 A1 | 4/2016 | Plaza et al. |
| 2016/0192941 A1 | 7/2016 | Hewitt et al. |
| 2016/0249934 A1 | 9/2016 | Hewitt et al. |
| 2016/0249935 A1 | 9/2016 | Hewitt et al. |
| 2016/0249937 A1 | 9/2016 | Marchand et al. |
| 2016/0262769 A1 | 9/2016 | Cragg et al. |
| 2016/0324528 A1 | 11/2016 | Hebert et al. |
| 2016/0324668 A1 | 11/2016 | Wallace et al. |
| 2016/0335757 A1 | 11/2016 | Florent et al. |
| 2016/0367260 A9 | 12/2016 | Hewitt et al. |
| 2017/0035437 A1 | 2/2017 | Sarge et al. |
| 2017/0079662 A1 | 3/2017 | Rhee et al. |
| 2017/0088988 A1 | 3/2017 | Thompson et al. |
| 2017/0095254 A1 | 4/2017 | Hewitt et al. |
| 2017/0128077 A1 | 5/2017 | Hewitt et al. |
| 2017/0191195 A1 | 7/2017 | Marchand et al. |
| 2017/0224350 A1 | 8/2017 | Shimizu et al. |
| 2017/0245862 A1 | 8/2017 | Cox et al. |
| 2017/0258473 A1 | 9/2017 | Plaza et al. |
| 2018/0000489 A1 | 1/2018 | Marchand et al. |
| 2018/0070955 A1 | 3/2018 | Greene, Jr. et al. |

(56) References Cited

U.S. PATENT DOCUMENTS

| | | |
|---|---|---|
| 2018/0140305 A1 | 5/2018 | Connor |
| 2018/0153554 A1 | 6/2018 | Walzman |
| 2018/0185130 A1 | 7/2018 | Janardhan et al. |
| 2018/0206849 A1 | 7/2018 | Hewitt et al. |
| 2018/0206851 A1 | 7/2018 | Walzman |
| 2018/0271540 A1 | 9/2018 | Merritt et al. |
| 2018/0303486 A1 | 10/2018 | Rosenbluth et al. |
| 2018/0338767 A1 | 11/2018 | Dasnurkar et al. |
| 2019/0046209 A1 | 2/2019 | Plaza et al. |
| 2019/0059909 A1 | 2/2019 | Griffin |
| 2019/0192166 A1 | 6/2019 | Hewitt et al. |
| 2019/0192167 A1 | 6/2019 | Lorenzo |
| 2019/0209180 A1 | 7/2019 | Kealey et al. |
| 2019/0218696 A1 | 7/2019 | Thompson et al. |
| 2019/0223876 A1 | 7/2019 | Badruddin et al. |
| 2019/0223878 A1 | 7/2019 | Lorenzo et al. |
| 2019/0223881 A1 | 7/2019 | Hewitt et al. |
| 2019/0269414 A1 | 9/2019 | Griffin |
| 2019/0290286 A1 | 9/2019 | Divino et al. |
| 2019/0298364 A1 | 10/2019 | Walsh et al. |
| 2019/0343533 A1 | 11/2019 | Costalat |
| 2019/0365385 A1 | 12/2019 | Gorochow et al. |
| 2020/0038035 A1 | 2/2020 | Griffin |
| 2020/0113576 A1 | 4/2020 | Gorochow et al. |
| 2020/0289124 A1* | 9/2020 | Rangwala ........ A61B 17/12145 |
| 2020/0289125 A1 | 9/2020 | Dholakia et al. |
| 2020/0289126 A1 | 9/2020 | Hewitt et al. |
| 2020/0367894 A1* | 11/2020 | Pereira ............. A61B 17/12177 |
| 2020/0367898 A1 | 11/2020 | Gorochow et al. |
| 2021/0007754 A1 | 1/2021 | Milhous et al. |
| 2021/0128165 A1 | 5/2021 | Pulugurtha et al. |
| 2021/0153871 A1 | 5/2021 | Griffin |
| 2021/0212698 A1 | 7/2021 | Connor |
| 2021/0236279 A1 | 8/2021 | Yohanan et al. |
| 2021/0275184 A1 | 9/2021 | Hewitt et al. |
| 2022/0192678 A1 | 6/2022 | Hewitt et al. |
| 2022/0257260 A1 | 8/2022 | Hewitt et al. |
| 2022/0323084 A1 | 10/2022 | Griffin |

FOREIGN PATENT DOCUMENTS

| | | |
|---|---|---|
| CN | 106974691 | 7/2017 |
| EP | 0706876 | 7/2000 |
| EP | 0808138 | 5/2005 |
| EP | 1576929 | 9/2005 |
| EP | 1844717 | 10/2007 |
| EP | 1923019 | 5/2008 |
| EP | 2055263 | 6/2009 |
| EP | 2258275 | 12/2011 |
| EP | 2596754 | 5/2013 |
| EP | 2157937 | 3/2017 |
| FR | 2333169 | 6/1997 |
| JP | 52141092 | 11/1977 |
| JP | H4-47415 | 4/1992 |
| WO | WO 95/30384 | 11/1995 |
| WO | WO 96/01591 | 1/1996 |
| WO | WO 97/26939 | 7/1997 |
| WO | WO 99/03404 | 1/1999 |
| WO | WO 99/05977 | 2/1999 |
| WO | WO 99/62432 | 12/1999 |
| WO | WO 01/45571 | 6/2001 |
| WO | WO 01/93782 | 12/2001 |
| WO | WO 02/00139 | 1/2002 |
| WO | WO 03/011151 | 2/2003 |
| WO | WO 03/032818 | 4/2003 |
| WO | WO 03/063732 | 8/2003 |
| WO | WO 2004/047649 | 6/2004 |
| WO | WO 2004/093742 | 11/2004 |
| WO | WO 2005/117718 | 12/2005 |
| WO | WO 2006/026744 | 3/2006 |
| WO | WO 2006/055683 | 5/2006 |
| WO | WO 2007/006139 | 1/2007 |
| WO | WO 2007/096183 | 8/2007 |
| WO | WO 2008/151204 | 12/2008 |
| WO | WO 2009/036219 | 3/2009 |
| WO | WO 2009/048700 | 4/2009 |
| WO | WO 2009/121006 | 10/2009 |
| WO | WO 2009/126747 | 10/2009 |
| WO | WO 2009/132045 | 10/2009 |
| WO | WO 2009/134337 | 11/2009 |
| WO | WO 2009/135166 | 11/2009 |
| WO | WO 2010/134914 | 11/2010 |
| WO | WO 2011/057002 | 5/2011 |
| WO | WO 2013/102848 | 7/2013 |
| WO | WO 2013/119332 | 8/2013 |
| WO | WO 2014/087245 | 6/2014 |
| WO | WO 2014/169261 | 10/2014 |
| WO | WO 2015/160721 | 10/2015 |
| WO | WO 2015/171268 | 11/2015 |
| WO | WO 2015/192019 | 12/2015 |
| WO | WO 2017/153603 | 9/2017 |
| WO | WO 2018/051187 | 3/2018 |
| WO | WO 2018/058033 | 3/2018 |
| WO | WO 2019/040494 | 2/2019 |
| WO | WO 2021/183793 A2 | 9/2021 |

OTHER PUBLICATIONS

Allen et al., "Micromachine Wedge Stepping Motor," pp. 1-6, Nov. 12-20, 1998 ASME International Mechanical Engineering Congress, Anaheim, CA.

Altes et al., "Creation of Saccular Aneurysms in the Rabbit: A model Suitable for Testing Endovascular Devices," American Roentgen Ray Society, Feb. 2000.

Ansari et al., "Thrombosis of a Fusiform Intracranial Aneurysm Induced by Overlapping Neuroform Stents: Case Report," *Neurosurgery*, E950-E951 vol. 60, No. 5, May 2007.

Atritech Press Release, Minneapolis, Jun. 18, 2007 "Atritech Announces Intellectual Property Acquisition, Transaction Establishes Company as leader in Left Atrial Appendage Market."

Caroff, J. et al., "Woven Endobridge (WEB) Device for endovascular treatment of ruptured intracranial wide-neck aneurysms: a single-center experience," *Neuroradiology*, 56(9):755-761 (Sep. 2014).

Caroff, J. et al., "Role of C-Arm VasoCT in the Use of Endovascular WEB Flow Disruption in Intracranial Aneurysm Treatment," *AJNR Am. J. Neuroradiol.* 35(7):1353-1357 (Jul. 2014).

Colla, R. et al., "Treatment of Wide-Neck Basilar Tip Aneurysms Using the Web II Device," The *Neuroradiology Journal* 26(6):669-677 (Dec. 2013).

De Backer, O. et al., "Percutaneous left atrial appendage occlusion for stroke prevention in atrial fibrillation: an update," *Open Heart*, 4:1-14 (2013).

Ding, Y.H. et al., "The Woven EndoBridge: A New Aneurysm Occlusion Device," *AJNR Am. J. Neruradiol.* 32:607-611 (Mar. 2011).

Duerig, T.W., "The Use of Superelasticity in Modern Medicine," MRS Bulletin, pp. 101-104 (Feb. 2002).

Fiorella, D. et al., "Interobserver variability in the assessment of aneurysm occlusion with the WEB aneurysm embolization system," *J. NeuroIntervent. Surg.* Jul. 1, 2014, pii: neurintsurg-2014-011251. doi: 10.1136/neurintsurg-2014-011251 [Epub ahead of print].

Fort Wayne Metals HHS Tube brochure, p. 28-29 (2009), Fort Wayne, Indiana, www.oldsite.fwmetals.com.

Grabenwoger et al., "Endothelialization of Biosynthetic vascular Prosthesis After Laser Perforation," *Ann Thorac Surg*, 66:S110-S114 (1998).

Guider Softip XF Guide Catheters Brochure, Boston Scientific Corporation 2004.

Gupta et al., "Nitinol Thin Film Three Dimensional Devices-Fabrication and Applications," From: SMST-2003: Proceedings of the International Conference on Shape Memory and Superelastic Technologies Published: 2004.

Hill et al., "Initial Results of the Amplatzer® Vascular Plug in the treatment of Congenital Heart Disease," Technology and Services, *Business Briefing: US Cardiology*, pp. 1-3 (2004).

Jeffree et al., "The Porus, Guidewire-Directed, Detachable Aneurysm Liner: A New Concept in the Endovascular Treatment of Intracranial Aneurysms," *AJNR Am J Neuradiol* 20:774-779 (May 1999).

(56) References Cited

OTHER PUBLICATIONS

Kallmes et al., "A New Endoluminal, Flow-Disrupting Device for Treatment of Saccular Eneurysms," *Stroke*, Journal of the American Heart Association 38:1-7 (2007).
Klisch, J. et al., "The Woven EndoBridge Cerebral Aneurysm Embolization Device (WEB II): initial clinical experience," *Neuroradiology* 53:599-607 (2011).
Kónya, A. et al., "Preliminary Results with a New Vascular Basket Occluder in Swine," *JVIR*, 10(8):1043-1049 (1999).
Kwon et al., "Preliminary Results of the Luna Aneurysm Embolization System in a Rabbit Model: A New Intrasaccular Aneurysm Occlusion Device," *AJNR Am J Neuroradiol*, 32:602-606 (Mar. 2011).
Lendlein, A. et al., "Shape-Memory Polymers," *Angew. Chem. Int. Ed.*, 41:2034-2057 (2002).
Lendlein, A. et al., "Biodegradable, Elastic Shape-Memory Polymers for Potential Biomedical Applications," *Science* 296:1673-1676 (May 31, 2002).
Lieber, B.B. et al., "The Role of Blood Impulse in Cerebral Aneurysm Coil Compaction: Effect of Aneurysm Neck Size," IMECE2003-43099, Proceedings of IMECE '03, 2003 ASME International Mechanical Engineering Congress, Washington, D.C. (Nov. 15-21, 2003).
Liu, C. et al., "Review of progress in shape-memory polymers," *J. Mater. Chem.* 17:1543-1558 (2007).
Lubicz, B. et al., "WEB Device for Endovascular Treatment of Wide-Neck Bifurcation Aneurysms," *AJNR Am. J. Neuroradiol.* 34(6):1209-1214 (Jun.-Jul. 2013).
Lubicz, B. et al., "WEB-DL Endovascular Treatment of Wide-Neck Bifurcation Aneurysms: Short- and Midterm Results in a European Study," *AJNR Am. J. Neuroradiol.* 35(3):432-438 (Mar. 2014). doi: 10.3174/ajnr.A3869. Epub Jan. 23, 2014.
Major, S. et al., "Life of Nitinol Drawn Filed Wires with Ag or Au Core for Medical Application," *International Journal of Mechanics* 2(7):73-80 (2013).
Matinlinna et al., "An Introduction to Silanes and Their Clinical Applications in Dentistry," *The International Journal of Prosthodontics*, 17(2):155-164 (2004).
Mine et al., "Intrasaccular flow-diversion for treatment of intracranial aneurysms: the Woven EndoBridge," *Expert Rev. Med. Devices* 11(3):315-325 (May 2014). doi: 10.1586/17434440.2014.907741. Epub Apr. 2, 2014.
Nakayama et al., "Development of Microporous Covered Stents: Geometrical Design of the Luminal Surface," *The International Journal of Artificial Organs*, 28(6):600-608 (2005).
Nemat-Nasser, S. et al., "Superelastic and cyclic response of NiTi SMA at various strain rates and temperatures," *Mechanics of Materials* 38:463-474 (2006).
Nishi et al., "Embolization of experimental aneurysms using a heparin-loaded stent graft with micropores," *Cardiovascular Radiation Medicine* 4:29-33 (2003).
Nishi et al., "Occlusion of Experimental Aneurysms with Heparin-Loaded, Microporous Stent Grafts," *Neurosurgery* 53(6):1397-1405 (Dec. 2003).
Papagiannaki, C. et al., "WEB Intrasaccular Flow Disruptor—Prospective, Multicenter Experience in 83 Patients with 85 Aneurysms," *AJNR Am. J. Neuroradiol.* 35(11):2106-2111 (Nov.-Dec. 2014). 35(11):2106-11. doi: 10.3174/ajnr.A4028. Epub Jul. 3, 2014.
Park, J. et al., "Percutaneous Left Atrial Appendage Transcatheter Occlusion (PLAATO) for Stroke Prevention in Atrial Fibrillation: 2-Year Outcome," *J Invasive. Cardiol.*, 21(9):446-450 (2009).
Pelton, A.R. et al., "Optimisation of processing and properties of medical grade Nitinol wire," *Min. Invas. Ther. & Allied Technol.* 9(1):107-118 (2000).
Pham, Q. et al., "Electrospinning of Polymeric Nanofibers for Tissue Engineering Applications: A Review," *Tissue Engr* 12(5):1197-1211 (1996).
Pierot, L. et al., "Intrasaccular Flow-Disruption Treatment of Intracranial Aneurysms: Preliminary Results of a Multicenter Clinical Study," *AJNR Am J Neuroradiol*. 33(7):1232-1238 (Aug. 2012). doi: 10.3174/ajnr.A3191. Epub Jun. 7, 2012.
Pierot, L. et al., "Endovascular WEB Flow Disruption in Middle Cerebral Artery Aneurysms: Preliminary Feasibility, Clinical, and Anatomical Results in a Multicenter Study," *Neurosurgery* 73(1):27-35 (Jul. 2013).
Pierot, L. et al., "Role, safety, and efficacy of WEB flow disruption: a review," EJMINT Invited Review, 2014: 1419000139 (May 8, 2014).
Peirot, L. et al., "WEB Treatment of Intracranial Aneurysms: Feasiblity, Complications, and 1-Month Safety Results with the WEB DL and WEB SL/SLS in the French Observatory," *AJNR Am J Neuroradiol*. Feb. 5, 2015 [Epub ehead ofprint].
Romero, J. et al., "Left Atrial Appendage Closure Devices," Clinical Medicine Insights: *Cardiology*, 8:45-52 (2014).
Rottiers, W. et al., "Shape Memory Materials and their applications," in Korolev's readings: conference proceedings, pp. 250-250 (2011).
Salamat et al., "Experimental Evaluation of a New Transcatheter Vascular Embolization Device in the Swine Model," *J Vasc Interv Radiol*, 12:301-311 (2002).
Schaffer, J.E. et al., "Engineering Characteristics of Drawn Filled Nitinol Tube," SMST-2003: Proceedings of the International Conference on Shape Memory and Superelastic Technologies (ASM International), pp. 109-118 (2004).
Schmitz-Rode, T. et al., "Self-expandable spindle for transcatheter vascular occlusion: in vivo experiments. Work in progress." *Radiology* 188:95-100 (Jul. 1993).
Simgen, A. et al., "Evaluation of a newly designed flow diverter for the treatment of intracranial aneurysms in an elastase-induced aneurysm model, in New Zealand white rabbits," *Neuroradiology* 56:129-137 (2014).
Spelle, L. et al., "Letter to the Editor," *Neuroradiol J.* Jun. 2014; 27(3):369. doi: 10.15274/NRJ-2014-10048. Epub Jun. 17, 2014.
Stoeckel, D. et al., "Self-expanding nitinol stents: material and design considerations," *Eur. Radiol.* 14:292-301 (2004).
Turk, A. et al., "Evaluation of the TriSpan Neck Bridge Device for the Treatment of Wide-Necked Aneurysms: An Experimental Study in Canines, Editorial Comment: An Experimental Study in Canines," *Stroke* 32:492-497 (Feb. 2001).
Wallner, A.K. et al., "Coiling after Treatment with the Woven EndoBridge Cerebral Aneurysm Embolization Device," *Interventional Neuroradiology* 18:208-212 (2012).
Yeow, W.L. et al., Device- and LAA-Specific Characteristics for Successful LAA Closures: Tips and Tricks, *Intervent. Cardiol. Clin.*, 3:239-254 (2014).
Zimmermann et al., "Patent Foramen Oval Closure With the SeptRx Device, Initial Experience with the First "In-Tunnel" Device," *JACC Cardiovascular Interventions* vol. 3, No. 9., 2010.
International Search Report and Written Opinion mailed Oct. 31, 2008 for International Application No. PCT/US2008/065694.
International Search Report and Written Opinion mailed Nov. 26, 2009 for International Application No. PCT/US2009/042592.
International Search Report and Written Opinion mailed Jul. 28, 2011 for International Application No. PCT/US2010/055494.
International Search Report and Written Opinion mailed Jul. 21, 2015 for International Application No. PCT/US2015/025609.
International Search Report and Written Opinion mailed Jan. 11, 2016 for International Application No. PCT/US2015/025613.
International Search Report and Written Opinion mailed Jun. 10, 2020 for International Application No. PCT/US2020/022275.
International Search Report and Written Opinion mailed Jun. 11, 2020 for International Application No. PCT/US2020/022364.
International Search Report and Written Opinion mailed Jun. 15, 2020 for International Application No. PCT/US2020/022319.
International Search Report and Written Opinion mailed Jul. 24, 2020 for International Application No. PCT/US2020/022096.
Extended European Search Report dated Apr. 25, 2014, in EP Appl No. EP 08770070.4 filed Jun. 3, 2008.
Extended European Search Report dated Jul. 30, 2014, in EP Appl No. EP 10829110 filed Nov. 4, 2010.

(56) References Cited

OTHER PUBLICATIONS

Extended European Search Report dated Dec. 13, 2017, in EP Appl No. EP 15789225.8 filed Jun. 5, 2015.
Official Action dated Mar. 8, 2019, in JP Appl. No. 2016-562549 filed Jun. 5, 2015.
Spelle, L. et al., "CLinical Assessment of WEB device in Ruptured aneurYSms (CLARYS): 12-month angiographic results of a multi-center study", J NeuroIntervent Surg, 2022, 0:1-6.
International Search Report and Written Opinion mailed Feb. 28, 2023 for International Application No. PCT/US2022/048938.
International Search Report and Written Opinion mailed Jul. 18, 2023 for International Application No. PCT/US23/20560.
Final Official Action dated Mar. 12, 2024, in JP Appl. No. 2022-169903.

* cited by examiner

DEVICES FOR TREATMENT OF VASCULAR DEFECTS

CROSS-REFERENCE TO RELATED APPLICATIONS

This application claims the benefit of priority under 35 U.S.C. § 119(e) from U.S. Provisional Application Ser. No. 63/238,402, filed Aug. 30, 2021, 63/238,434, filed Aug. 30, 2021, and 63/239,122, filed Aug. 31, 2021, which are all hereby expressly incorporated by reference in their entireties for all purposes.

STATEMENT REGARDING FEDERALLY SPONSORED RESEARCH OR DEVELOPMENT

Not applicable.

FIELD OF THE INVENTION

Embodiments of devices and methods herein are directed to blocking a flow of fluid into a small interior chamber of a saccular cavity or vascular defect within a mammalian body. More specifically, embodiments herein are directed to devices and methods for treatment of a vascular defect of a patient including some embodiments directed specifically to the treatment of cerebral aneurysms of patients.

BACKGROUND OF THE INVENTION

The mammalian circulatory system is comprised of a heart, which acts as a pump, and a system of blood vessels which transport the blood to various points in the body. Due to the force exerted by the flowing blood on the blood vessel the blood vessels may develop a variety of vascular defects. One common vascular defect, known as an aneurysm, results from the abnormal widening of the blood vessel. Typically, a vascular aneurysm forms as a result of the weakening of the wall of a blood vessel and subsequent ballooning and expansion of the vessel wall. If, for example, an aneurysm is present within an artery of the brain, and the aneurysm should burst with resulting cranial hemorrhaging, death could occur.

Surgical techniques for the treatment of cerebral aneurysms typically involve a craniotomy requiring creation of an opening in the skull of the patient through which the surgeon can insert instruments to operate directly on the patient's brain. For some surgical approaches, the brain must be retracted to expose the parent blood vessel from which the aneurysm arises. Once access to the aneurysm is gained, the surgeon places a clip across the neck of the aneurysm thereby preventing arterial blood from entering the aneurysm. Upon correct placement of the clip the aneurysm will be obliterated in a matter of minutes. Surgical techniques may be effective treatment for many aneurysms. Unfortunately, surgical techniques for treating these types of conditions include major invasive surgical procedures which often require extended periods of time under anesthesia involving high risk to the patient. Such procedures thus require that the patient be in generally good physical condition in order to be a candidate for such procedures.

Various alternative and less invasive procedures have been used to treat cerebral aneurysms without resorting to major surgery. One approach to treating aneurysms without the need for invasive surgery involves the placement of sleeves or stents into the vessel and across the region where the aneurysm occurs. Such flow diverter devices maintain blood flow through the vessel while reducing blood pressure applied to the interior of the aneurysm. Certain types of stents are expanded to the proper size by inflating a balloon catheter, referred to as balloon expandable stents, while other stents are designed to elastically expand in a self-expanding manner. Some stents are covered typically with a sleeve of polymeric material called a graft to form a stent-graft. Stents and stent-grafts are generally delivered to a preselected position adjacent a vascular defect through a delivery catheter. In the treatment of cerebral aneurysms, covered stents or stent-grafts have seen very limited use due to the likelihood of inadvertent occlusion of small perforator vessels that may be near the vascular defect being treated.

In addition, current uncovered stents are generally not sufficient as a stand-alone treatment. In order for stents to fit through the microcatheters used in small cerebral blood vessels, their density is usually reduced such that when expanded there is only a small amount of stent structure bridging the aneurysm neck. Thus, they do not block enough flow to cause clotting of the blood in the aneurysm and are thus generally used in combination with vaso-occlusive devices, such as the coils discussed above, to achieve aneurysm occlusion.

Some procedures involve the delivery of embolic or filling materials into an aneurysm. The delivery of such vaso-occlusion devices or materials may be used to promote hemostasis or fill an aneurysm cavity entirely. Vaso-occlusion devices may be placed within the vasculature of the human body, typically via a catheter, either to block the flow of blood through a vessel with an aneurysm through the formation of an embolus or to form such an embolus within an aneurysm stemming from the vessel. A variety of implantable, coil-type vaso-occlusion devices are known. The coils of such devices may themselves be formed into a secondary coil shape, or any of a variety of more complex secondary shapes. Vaso-occlusive coils are commonly used to treat cerebral aneurysms but suffer from several limitations including poor packing density, compaction due to hydrodynamic pressure from blood flow, poor stability in wide-necked aneurysms, and complexity and difficulty in the deployment thereof as most aneurysm treatments with this approach require the deployment of multiple coils. Coiling is less effective at treating certain physiological conditions, such as wide neck cavities (e.g., wide neck aneurysms) because there is a greater risk of the coils migrating out of the treatment site.

A number of aneurysm neck bridging devices with defect spanning portions or regions have been attempted, however, none of these devices have had a significant measure of clinical success or usage. A major limitation in their adoption and clinical usefulness is the inability to position the defect spanning portion to assure coverage of the neck. Existing stent delivery systems that are neurovascular compatible (i.e., deliverable through a microcatheter and highly flexible) do not have the necessary rotational positioning capability. Another limitation of many aneurysm bridging devices described in the prior art is the poor flexibility. Cerebral blood vessels are tortuous and a high degree of flexibility is required for effective delivery to most aneurysm locations in the brain.

What has been needed are devices and methods for delivery and use in small and tortuous blood vessels that can substantially block the flow of blood into an aneurysm, such as a cerebral aneurysm, with a decreased risk of inadvertent aneurysm rupture or blood vessel wall damage. In addition, what has been needed are methods and devices suitable for blocking blood flow in cerebral aneurysms over an extended period of time without a significant risk of deformation, compaction, or dislocation.

Intrasaccular occlusive devices are part of a newer type of occlusion device used to treat various intravascular conditions including aneurysms. They are often more effective at treating these wide neck conditions, or larger treatment areas. The intrasaccular devices comprise a structure that sits within the aneurysm and provides an occlusive effect at the neck of the aneurysm to help limit blood flow into the aneurysm. The rest of the device comprises a relatively conformable structure that sits within the aneurysm helping to occlude all or a portion of the aneurysm. Intrasaccular devices typically conform to the shape of the treatment site. These devices also occlude the cross section of the neck of the treatment site/aneurysm, thereby promoting clotting and causing thrombosis and closing of the aneurysm over time. In larger aneurysms, there is a risk of compaction where the intrasaccular device can migrate into the aneurysm and leave the neck region.

Intrasaccular implants can also still have issues with recurrence, especially when used to treat large-giant (>5 mm) bifurcation aneurysms, which usually have 30% recurrence ratio with coiling.

There is a need for occlusive devices that can be used to treat large aneurysms but that are still able to be delivered through very small catheters, with improved occlusion results.

There is also a need for occlusive devices that have a size that is suitable to treat multiple different sized aneurysms.

There is also a need for implants that address the issues of recurrence, especially in large-giant bifurcation aneurysms.

SUMMARY OF THE INVENTION

An occlusion device is described that is used to treat a variety of conditions, including aneurysms and neurovascular aneurysms. In some embodiments, the occlusion device is configured as an intrasaccular device.

In some embodiments, the device includes a permeable shell having a proximal cavity or pocket in which an additional embolic device may be inserted. The proximal cavity may be relatively small, but wide in relation to the aneurysm neck, such that it could be quickly filled with an additional embolic material, such as one or more coils. Such a device may facilitate compatibility with smaller microcatheters for certain sized implants and/or lead to improved clinical effectiveness. The device may be made from a plurality of filaments configured in a woven mesh. The permeable shell may have sufficient radial strength to resist compaction and sufficient metal surface area to prevent prolapsing of the coils or other filling devices into the parent vessel.

In some embodiments, device for treatment of a patient's cerebral aneurysm includes a permeable shell having a proximal end, a distal end, an outer surface, an inner surface, a radially constrained elongated state configured for delivery within a catheter lumen, an expanded state with a longitudinally shortened configuration relative to the radially constrained state, and a plurality of elongate filaments that are woven together to form a mesh, the expanded state having an exterior cavity defined by the outer surface of the permeable shell, wherein the exterior cavity comprises an opening communicating with a chamber, wherein a maximum length of the opening is smaller than a maximum length of the chamber.

In some embodiments, a device for treatment of a patient's cerebral aneurysm includes a permeable shell having a plurality of elongate filaments that are woven together to form a mesh, the permeable shell having a first end, a second end, a radially constrained elongated configuration for delivery within a catheter lumen, and an expanded preset configuration with a longitudinally shortened configuration relative to the radially constrained state, wherein in the expanded preset configuration, a diameter of the first end is smaller than a diameter of the second end.

In many embodiments, a device for treatment of a patient's cerebral aneurysm includes: a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening, wherein the outer skirt is coupled to the permeable shell at one node or a plurality of nodes.

BRIEF DESCRIPTION OF THE DRAWINGS

These and other aspects, features, and advantages of which embodiments of the invention are capable of will be apparent and elucidated from the following description of embodiments of the present invention, reference being made to the accompanying drawings, in which.

The various figures included show the occlusive device according to one or more embodiments.

DESCRIPTION OF EMBODIMENTS

The presented embodiments shall generally relate to occlusive devices that can be used to treat aneurysms.

Intrasaccular occlusive devices that include a permeable shell formed from a woven or braided mesh have been described in US 2016/0249935, US 2017/0095254, US 2016/0249934, US 2016/0367260, US 2016/0249937, US 2018/0000489, and US 2019/0223881 all of which are hereby expressly incorporated by reference in their entireties for all purposes.

Implant with Proximal Cavity

Figure 1:
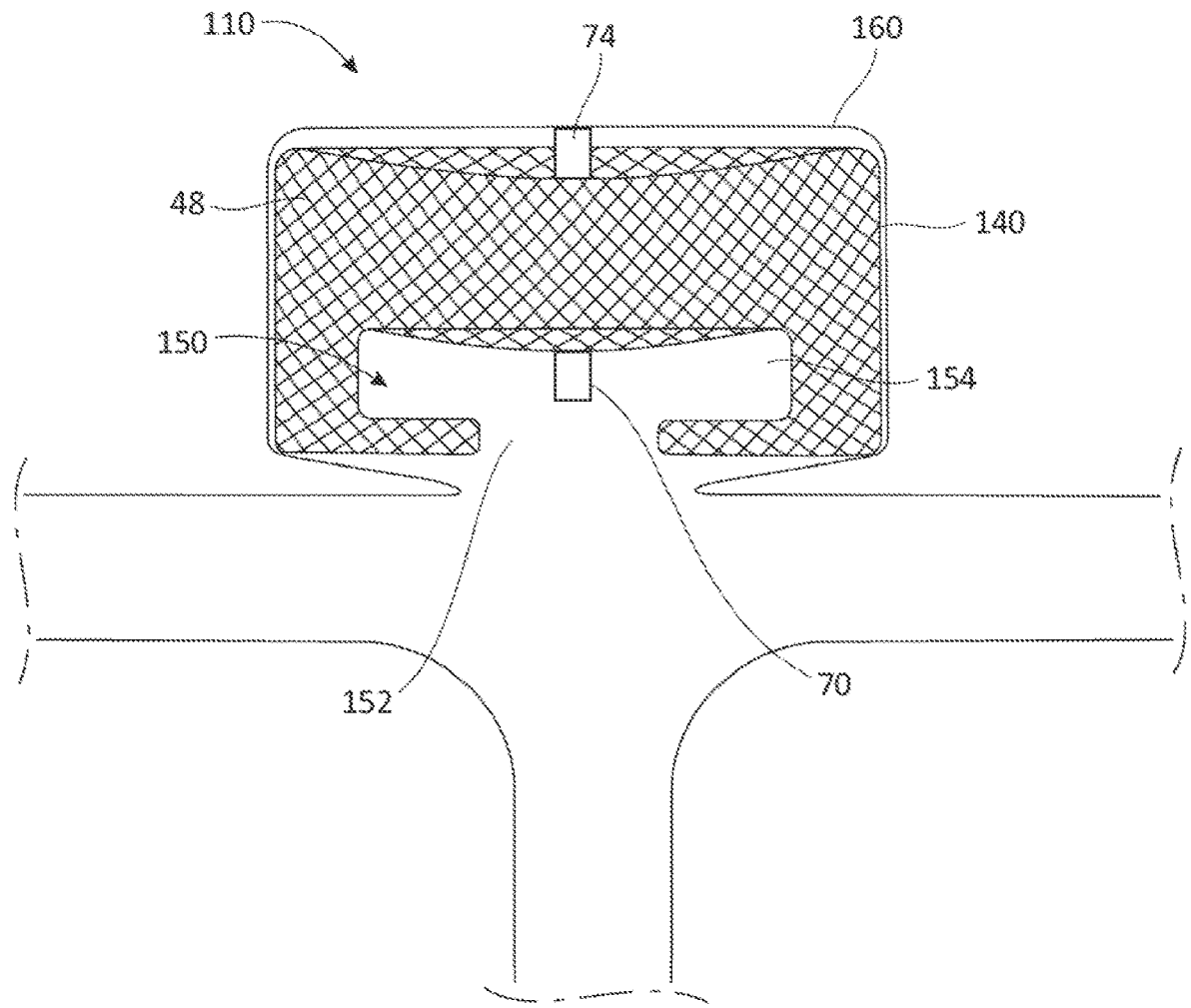
FIG. 1 shows a device for treatment of an aneurysm that includes a proximal cavity.

FIG. 1 depicts an intrasaccular device 110 that includes a permeable shell 140 that has an exterior cavity or pocket 150. The permeable shell has a proximal end, a distal end, a longitudinal axis, and may be made from a plurality of elongate resilient filaments. The filaments may have a woven structure and are secured relative to each other at the proximal end and distal end of the permeable shell 140. The permeable shell 140 of the device 110 has a radially constrained elongated state configured for delivery within a microcatheter, with the thin woven filaments extending longitudinally from the proximal end to the distal end of each permeable shell radially adjacent each other along a length of the filaments. The permeable shell 140 has an expanded relaxed state with a longitudinally shortened configuration relative to the radially constrained state. In the expanded state, the woven filaments form the self-expanding resilient permeable shell 140 in a smooth path radially expanded from a longitudinal axis of the permeable shell between the proximal end and distal end. The woven structure of the filaments forming the permeable shell includes a plurality of openings in each permeable shell 140 formed between the woven filaments. The braided mesh 48 of each permeable shell 140 defines an interior cavity.

The expanded state of the permeable shell 140 may have a maximum outer diameter of about 4 mm, alternatively about 5 mm, alternatively about 6 mm, alternatively about 7 mm, alternatively about 8 mm, alternatively about 9 mm, alternatively about 10 mm, alternatively about 11 mm. The expanded state of the permeable shells 140 can have a height or length of about 2.6 mm, about 3 mm, about 3.6 mm, about 4 mm, about 4.6 mm, about 5 mm, about 5.6 mm, about 6 mm, about 6.6 mm, about 7 mm, about 7.6 mm, about 8 mm, about 8.6 mm, about 9 mm, about 9.6 mm, or about 10 mm.

The exterior cavity or pocket 150 may be located at the proximal end of the permeable shell 140 and may have a small, narrow opening 152 at the proximal end of the permeable shell 140 having a maximum length, e.g., diameter, that communicates with a wider chamber portion 154 having a maximum length, e.g., diameter. The length, e.g., diameter, of the wider chamber portion 154 may be larger than the diameter of the narrow opening 152. The maximum length, e.g., diameter, of the wider cavity portion 154 may be between about 30% to about 90%, alternatively between about 30% to about 80%, alternatively between about 30% to about 75%, alternatively between about 40% to about 80%, alternatively between about 50% to about 80%, alternatively between about 30% to about 75%, alternatively between about 50% to about 90%, alternatively between about 50% to about 80%, alternatively about 50%, alternatively about 60%, alternatively about 70%, alternatively about 75%, alternatively about 80%, alternatively about 90%, as long as a maximum outer diameter of the permeable shell 140.

The maximum length, e.g., diameter, of the opening 152 of the exterior cavity 150 may be between about 10% to about 50%, alternatively about 10% to about 40%, alternatively about 5% to about 40%, alternatively about 5% to about 30% of the maximum length, e.g., diameter, of the wider chamber portion 154.

The exterior cavity or pocket 150 at the proximal end of the permeable shell may be wider, or have a maximum diameter that is longer than a length, e.g., a maximum length, of the aneurysm neck opening. In some embodiments, the proximal exterior cavity may be filled with additional embolic materials, including but not limited to, coils or embolic coils. The length, e.g., diameter, of the wider chamber portion 154 may be at least about the same length as a length of the aneurysm neck. Alternatively, the length, e.g., diameter, of the wider cavity portion 154 may be about +/−10%, alternatively about +/−15%, alternatively about +/−20%, alternatively between about +/−5% and +/−25%, alternatively between about +/−10% and +/−25%, of the length of the aneurysm neck.

The exterior cavity or pocket 150 may define a void space having a volume that is between about 10% to about 50%, alternatively between about 20% to about 50%, alternatively between about 15% to about 40%, alternatively between about 10% to about 30% of a volume of an inner cavity of the permeable shell defined by the inner surface of the permeable shell.

Permeable shell 140 may also have distal and proximal marker bands 74, 70. In some embodiments, a single maker band may only be included. For example, if embodiments in which the implant is made from a single mesh that is folded over, only a single marker band at either the proximal or distal end may be included. Such multi-layer devices have been described in U.S. Application Ser. No. 63/127,517, filed Dec. 18, 2020, which has been expressly incorporated by reference in its entirety for all purposes. The proximal marker band 70 may be located in the exterior cavity 150. The distal end of the permeable shell 140 may have a slight concavity such that a proximal end of the distal marker band 74 may be located below a circumferential line defined by a distal most portion of the mesh 48 of the permeable shell 140. The proximal and distal marker bands 70, 74 may each be located outside of the interior cavity of the permeable shell. Alternatively, in some embodiments, either of the proximal 70 or distal marker bands 74, or both, may be located in the interior cavity of the permeable shell 140 where the proximal and or distal end are inverted.

The permeable shell 140 of the implant may be made from a braided tubular mesh. The mesh or braided portion 48 may be made from a plurality of filaments in a woven structure that are secured relative to each other at the proximal end, e.g., in proximal marker band 70. The plurality of filaments that make up the mesh or braided portion 48 may be made from nitinol, stainless steel, drawn filled tubing (e.g., platinum or tantalum core with a nitinol jacket), platinum, platinum alloys such as platinum/tungsten, or a mixture thereof. A distal end of the mesh or braided portion 48 may be secured relative to each other at the distal end, e.g., in distal marker band 74. A proximal end of the mesh or braided portion 48 may be secured relative to each other at the proximal end, e.g., in proximal marker band 70. The wires may have a diameter of about 0.001 inches to about 0.003 inches, alternatively about 0.0015 inches to about 0.0025 inches. Suitable materials and sizes of wires for constructing mesh implants are described in US 2017/0095254, US 2016/0249934, US 2016/0367260, US 2016/0249937, and US 2018/0000489, all of which are hereby expressly incorporated by reference in their entirety for all purposes.

The permeable shell 140 may be made from fewer filaments than an implant in which the permeable shell does not include the proximal exterior cavity or pocket 150. The permeable shell 140 may be made from a mesh that includes between about 24 to about 96, alternatively about 24 to about 72, alternatively about 48 to about 96, alternatively about 48 to about 72 filaments. For example, the permeable shell may be made from about 48 filaments having a diameter of about 0.002 inches or about 72 filaments having a diameter of about 0.0015 inches. Thus, smaller catheters may be used to deliver permeable shells having large diameters because they may be made from fewer filaments. For example, a permeable shell having a diameter of between about 8 mm and about 9 mm may be delivered through a microcatheter having an inner diameter of between about 0.0016 inches and about 0.028 inches.

Figure 2:
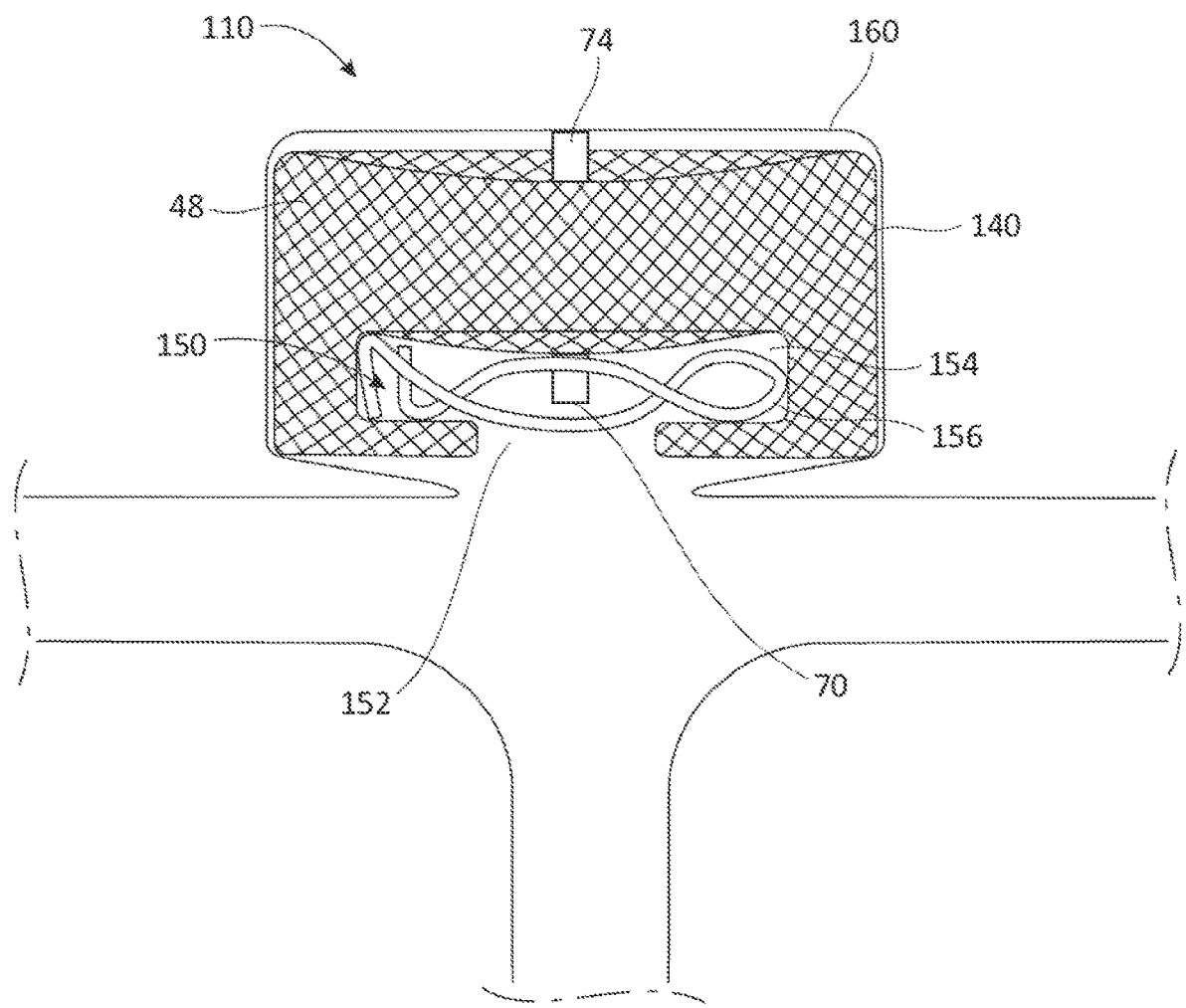
FIG. 2 shows a device for treatment of an aneurysm that includes embolic material in the proximal cavity.
Figure 3:
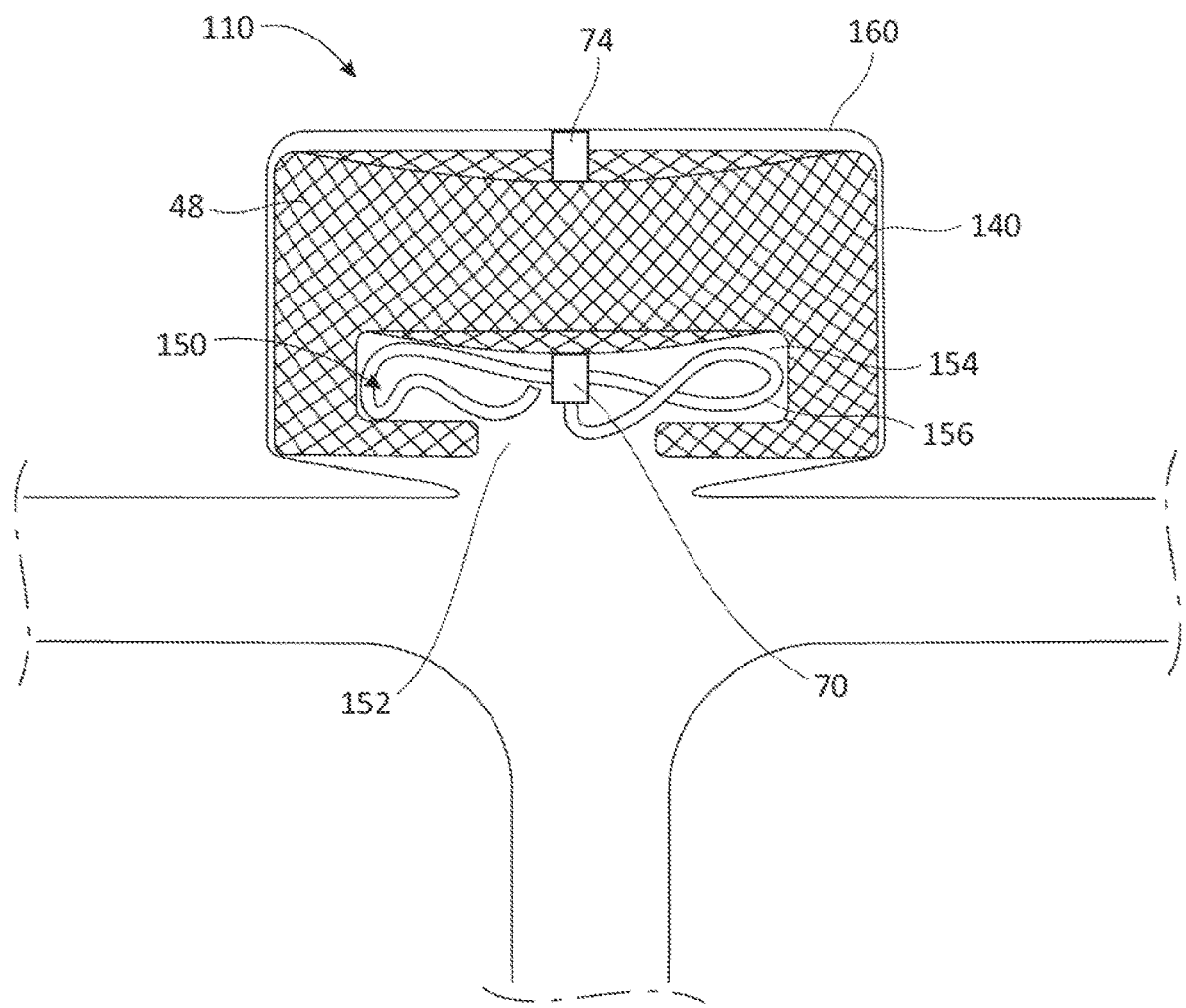
FIG. 3 shows an alternative device for treatment of an aneurysm that includes embolic material in the proximal cavity.

As seen in FIGS. 2 and 3, in some embodiments, the exterior cavity or pocket 150 may be filled with an embolic material that has bioactive or accelerated healing properties, including but not limited to, high density coils 156. In some embodiments, the coils 156 may include hydrogel. Hydrogels are compounds that absorb water from the blood and surrounding tissue and swell in response—thereby increasing their occlusive effect. In some examples, the coils 156 may utilize an inert hydrogel core—for instance, the hydrogel may be affixed internally along one more wound segments of the coil. Alternatively, the hydrogel may be coated on an external surface of the wound wire comprising the coil 156. A detailed description of coils, including hydrogel coils, can be found in U.S. Pat. Nos. 6,238,403, 6,878,384, 8,377,091, and 10,499,925, which are hereby expressly incorporated by reference in their entirety for all purposes.

In some embodiments, the coil(s) 156 may be a separate implantable component that is not physically coupled to the permeable shell 140 and is deployed into the proximal exterior cavity 150 after the permeable shell 140 has been deployed into the aneurysm. In other embodiments, the coil 156 may be coupled to or otherwise connected with the permeable shell 140 and is deployed with the permeable shell 140. As seen in FIG. 3, in some embodiments, a distal end of the coil 156 may be coupled to a proximal end of the proximal marker band 74 of the permeable shell 140. And a distal end of the coil 156 may be releasably coupled to a pusher device to facilitate delivery of a single implant. In some embodiments, multiple coils are deployed into the proximal exterior cavity 150, where the multiple coils may be deployed one at a time as separate devices or they may be sequentially connected to each other and the proximal marker 70 of the permeable shell 140, and be deployed as a single device 110.

Delivery and deployment of device embodiment 110 discussed herein may be carried out by first compressing the device 110 to a radially constrained and longitudinally flexible state. The device 110 may then be delivered to a desired treatment site, e.g., aneurysm 160, while disposed within the microcatheter 61, and then ejected or otherwise deployed from a distal end of the microcatheter. In other method embodiments, the microcatheter may first be navigated to a desired treatment site over a guidewire or by other suitable navigation techniques. The distal end of the microcatheter may be positioned such that a distal port of the microcatheter is directed towards or disposed within a vascular defect 160 to be treated and the guidewire withdrawn. The device 110 secured to a suitable delivery apparatus and in a radially constrained configuration, and having been inserted into a proximal portion of the inner lumen of the microcatheter, may be distally advanced to the vascular defect 160 through the inner lumen.

Once disposed within the vascular defect 160, the device 110 may then be allowed to assume an expanded relaxed or partially relaxed state with the permeable shell 140 of the device spanning or partially spanning a portion of the vascular defect 160 or the entire vascular defect 160. The permeable shell 140 may be positioned such that the narrow opening 152 of the exterior cavity 150 may be in fluid communication or positioned over the neck of the aneurysm. In embodiments where the permeable shell 140 is coupled to one or more coils 156, the pusher device may further advance such that the one or more coils are deployed within the proximal exterior cavity 150. In embodiments where the permeable shell 140 and one or more coils 156 are not coupled together, a delivery device, e.g., pusher, that is releasably connected to a proximal end of the one or more coils may be advanced to the treatment site such that the one or more coils may be deployed within the proximal exterior cavity 150. Once the device 110 and one or coils are deployed at a desired treatment site, and the permeable shell 140, one or more coils 150, or both have been detached from the delivery device(s), the microcatheter may then be withdrawn.

Trapezoidal Implants

For any sized aneurysm, there may be numerous different types of sizes of occlusive devices that could be chosen by the physician to treat the aneurysm, where the devices may differ in height and diameter. The implants may also have different expanded shapes, e.g., barrel or spherical shape. Thus, many different sized and models of implants may have approximately the same volume as the aneurysm to be treated, and therefore are an acceptable "volume match" for the aneurysm.

Figure 4A:
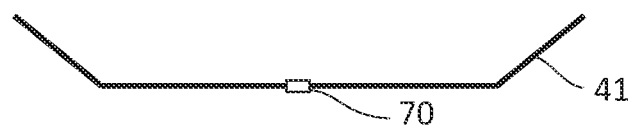
FIGS. 4A-4C show a schematic of a device for treatment of an aneurysm that does not fill the entire aneurysm.
Figure 4B:
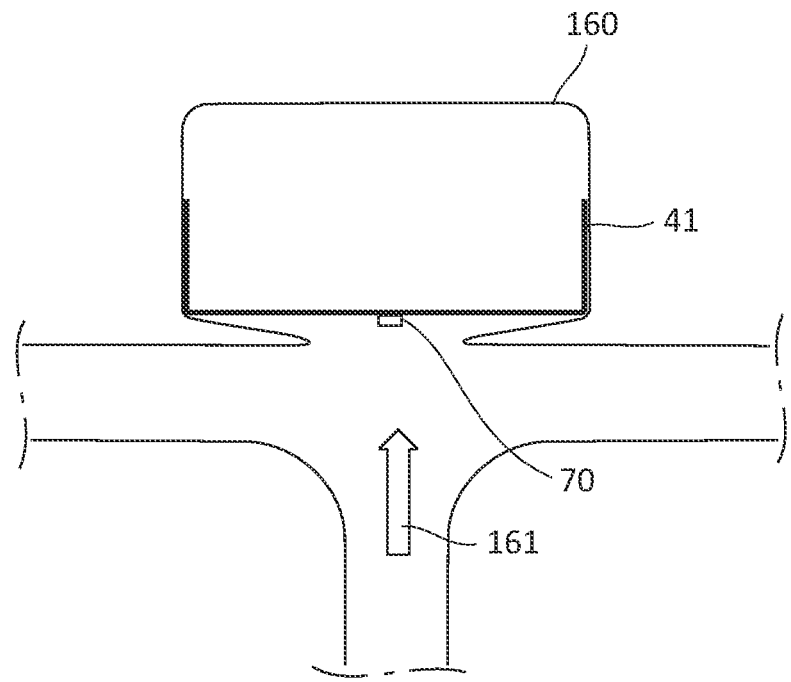
Figure 4C:
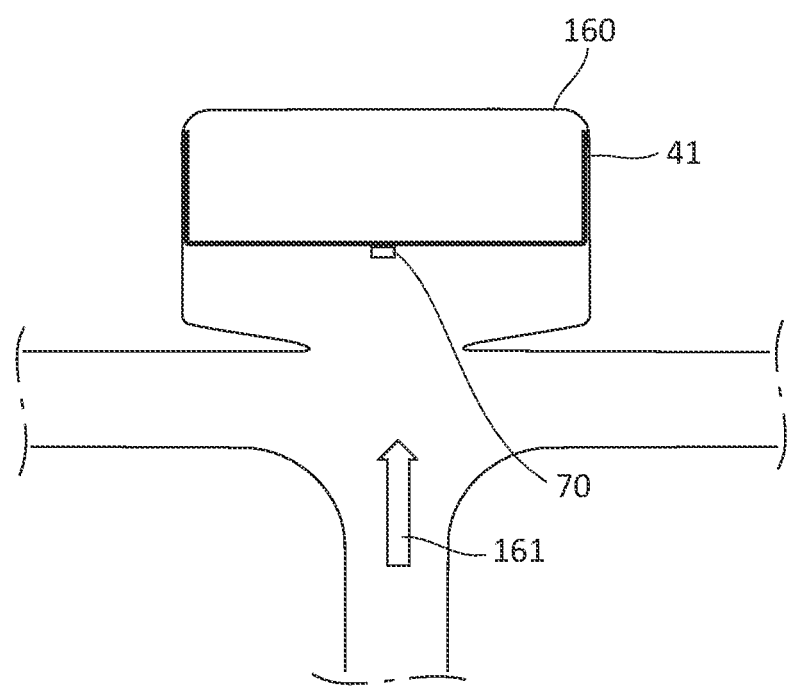

Alternatively, the implant may be less than the total height of the aneurysm. As seen in FIGS. 4A and 4B, some devices 41 are designed to only fill approximately half of the aneurysm. These implants may be able to be used in different sized aneurysms because volume matching is not required. For implants 41 that do not occupy the majority of the aneurysm cavity, however, hemodynamic and/or clotting forces may cause the implant to move, as seen in FIG. 4C, leading to aneurysm regrowth.

The presented embodiments shall generally relate to occlusive devices that can be used to treat different sized aneurysms. The devices described herein may have a preset expanded shape that can conform to fit into and substantially fill numerous sizes of aneurysms.

One method of choosing a device for placement into a particular aneurysm is to match the volume of the device 210 with the volume of the aneurysm. For devices 210 that have a permeable shell 240 having an approximate barrel or spherical shape, the physician may choose an implant according to a "+1/−1" strategy. For example, the permeable shell 240 of the device 210 chosen may have a diameter of about 1 mm greater than a mean diameter of the aneurysm and a height of about 1 mm less that a minimum height of the aneurysm. Oversizing the permeable shell 240 by about 1 mm relative to the aneurysm diameter may ensure that there is a slight compression force on the implant after it is deployed in the aneurysm. This compression force may help the permeable shell 240 to maintain a stable position after implantation as blood flows into and out of the aneurysm.

Figure 5:
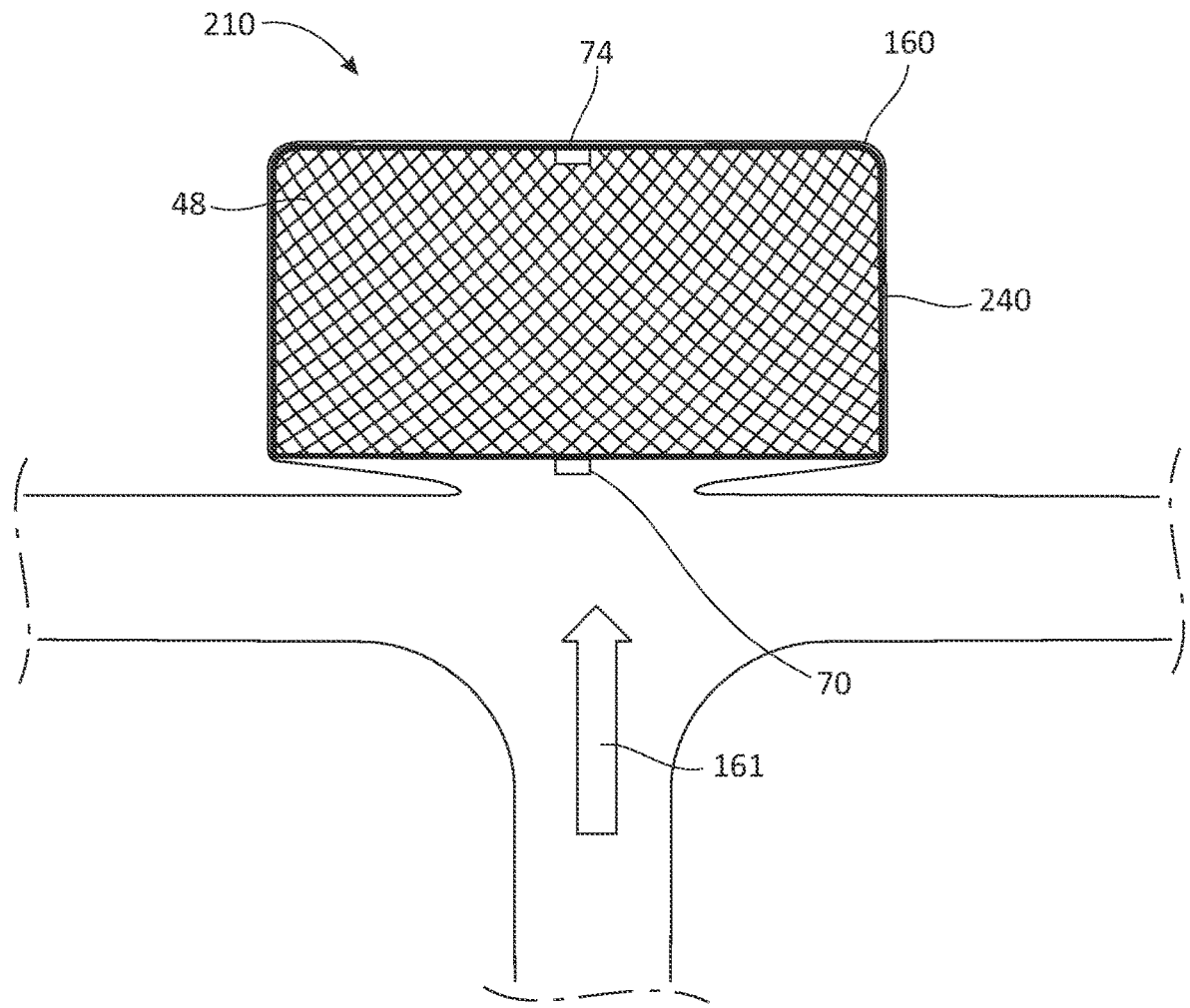
FIG. 5 shows a device for treatment of an aneurysm.

When the permeable shell 240 compresses in diameter by about 1 mm to fit within the aneurysm, the permeable shell 240 may elongate by about 1 mm in height, thereby occupying approximately the full aneurysm volume, as seen in FIG. 5. Thus, the permeable shell 240 selected may be approximately equal to the aneurysm volumetrically but initially larger in diameter. This diametric oversizing may provide friction against the aneurysm wall after deployment, and "volume matching" may allow the permeable shell 240 to fill the aneurysm fully, thereby maintaining a stable position as hemodynamic and clot contraction forces (represented by the arrow 161) exert pressure on the implant over time.

For example, when treating an aneurysm with a mean diameter of about 5 mm diameter, the physician may choose between a device 310 having a diameter×height of 6×3, 6×4, 6×5 (e.g., barrel shape), or a spherical device having a diameter of about 6 mm. Similarly, an aneurysm with a mean diameter of about 6 mm can be treated with a device 310 having a diameter×height of 7×3, 7×4, or 7×5 (e.g., barrel shape), or a spherical device having a diameter of about 7 mm.

Figure 6A:
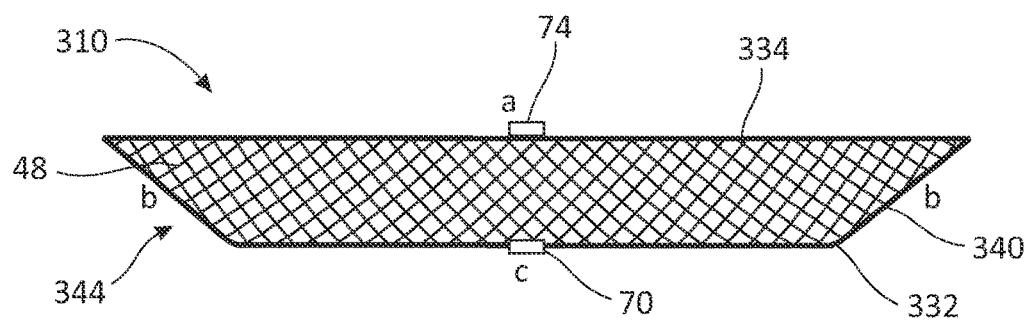
FIG. 6A show a device for treatment of an aneurysm having an unconstrained configuration first and second ends with different diameters.

In alternative embodiments, the device may have an expanded preset unconstrained shape and a different expanded shape when it is deployed in the aneurysm, where it is constrained by the aneurysm walls. The expanded preset shape may be capable of being deformed by compressive forces of the aneurysm wall into the different expanded shape. The permeable shell 340 may have and expanded, preset configuration 344 that is frustoconical, e.g., may resemble an upside-down cone with the apex removed. As seen in FIG. 6A, a cross-section of the expanded, preset configuration of the implant may be a trapezoid. A first end 332, e.g., the proximal end, may have a diameter or a perimeter that is smaller than a diameter or perimeter of a second end 334, e.g., the distal end. With this design, the device 310 may be generally oversized by more than about 1 mm relative to the aneurysm mean diameter. As with other shaped implants described herein (e.g., barrel, globular, or spherical), the device 310 may approximately occupy the entire aneurysm cavity and therefore remain stable over time as hemodynamic and clot contraction forces (represented by the arrow 161 in FIG. 6B) exert pressure on the implant.

Figure 6B:
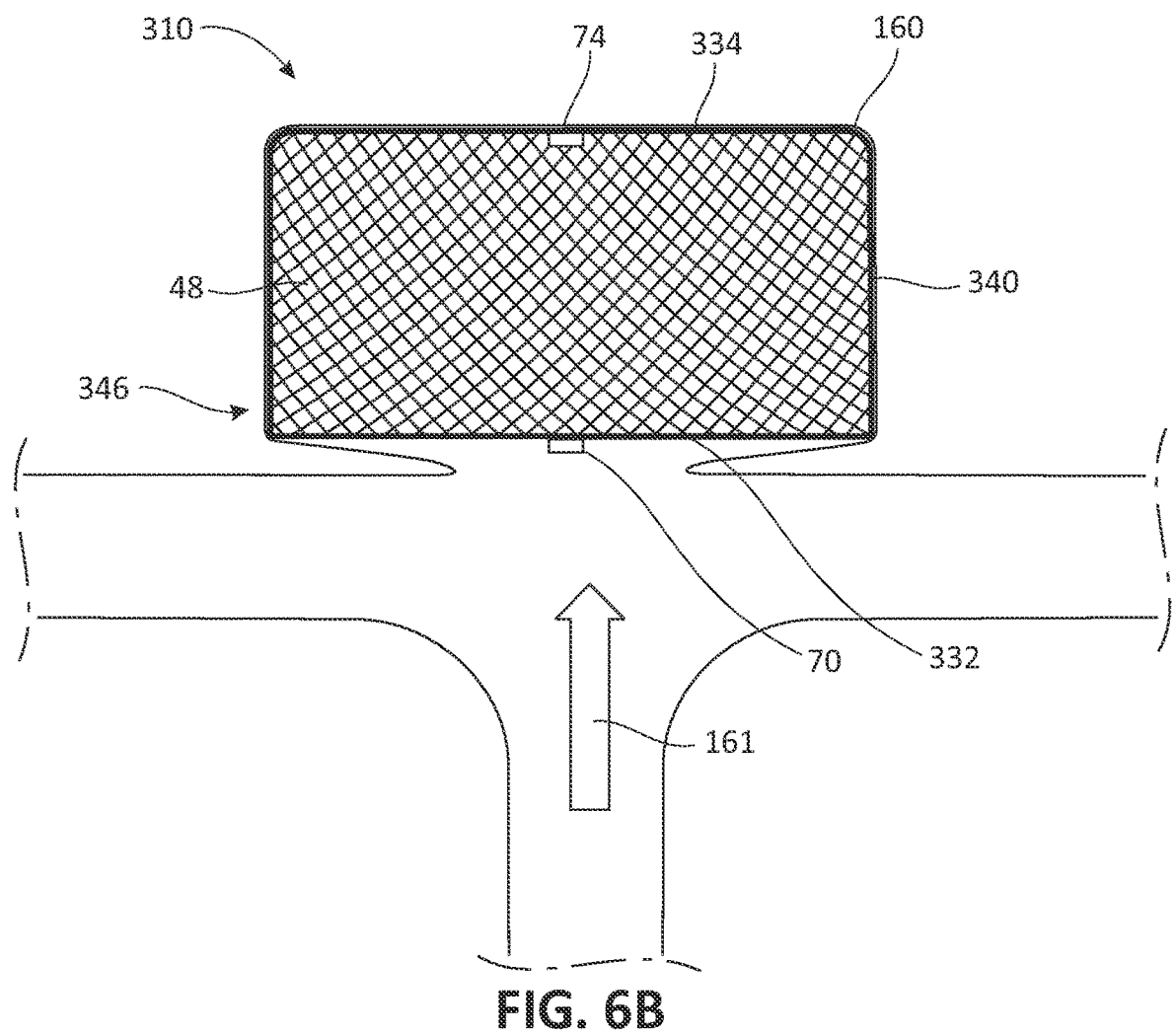
FIG. 6B shows the device of FIG. 3A deployed in the aneurysm.

One advantage of the frustoconical shape of device 310 is that the physician may consider fewer models in determining an appropriate size for the aneurysm. For example, a 7×4 device may be currently used to treat 6×5 aneurysms per the "+1/−1" sizing strategy. A permeable shell with a frustoconical shape, however, with a diameter of 8 mm at the second (larger) end and a total (two-dimensional) cross-sectional perimeter (see FIG. 6A, cross-sectional perimeter=a+b+b+c) of 22 mm might be used to treat 7×4 and 6×5 aneurysms. The two-dimensional or cross-sectional perimeter may also correspond to sides of the rectangular shape of the expanded state in the aneurysm, as seen in FIG. 6B, see, e.g., 6+6+5+5 or 7+7+4+4. More accurate estimates could be obtained using $(\pi/4)d^2L$, where d is the diameter of the aneurysm and L is the length (or height) of the aneurysm. Thus, implants having a preset frustoconical expanded, unconstrained shape may maintain the performance and stability characteristics of spherical or barrel shaped implants, while also reducing the number of models from which the physician must choose.

Permeable shell 340 may also have distal and proximal marker bands 74, 70. In some embodiments, a single maker band may only be included. For example, if embodiments in which the implant is made from a single mesh that is folded over, only a single marker band at either the proximal or distal end may be included. Such multi-layer devices have been described in U.S. Application Ser. No. 63/127,517, filed Dec. 18, 2020, which has been expressly incorporated by reference in its entirety for all purposes.

The permeable shell of the implant may be made from a braided tubular mesh. The mesh or braided portion 48 may be made from a plurality of filaments in a woven structure that are secured relative to each other at the proximal end, e.g., in proximal marker band 70. The plurality of filaments that make up the mesh or braided portion 48 may be made from nitinol, stainless steel, drawn filled tubing (e.g., platinum or tantalum core with a nitinol jacket), platinum, platinum alloys such as platinum/tungsten, or a mixture thereof. A distal end of the mesh or braided portion 48 may be secured relative to each other at the distal end, e.g., in distal marker band 74. The wires may have a diameter of about 0.001 inches to about 0.003 inches, alternatively about 0.0015 inches to about 0.0025 inches. Suitable materials and sizes of wires for constructing mesh implants are described in US 2017/0095254, US 2016/0249934, US 2016/0367260, US 2016/0249937, and US 2018/0000489, all of which are hereby expressly incorporated by reference in their entirety for all purposes.

The permeable shell 340 of the device 310 may have a radially constrained elongated configuration for delivery within a microcatheter. As seen in FIG. 6A, the permeable shell 340 may have an expanded preset configuration 344 or unconstrained configuration with a frustoconical, longitudinally shortened configuration relative to the radially constrained state. Once deployed into an aneurysm 160, however, as seen in FIG. 6B, the permeable shell may assume a different (other than the frustoconical preset configuration) expanded shape 346 in response to compressive forces from the aneurysm walls. The permeable shell 340 may substantially conform to the shape of the aneurysm. Because the diameter of the distal end of the permeable shell may be larger than a maximum diameter of the aneurysm (e.g., about or at least about 1 mm larger), the sides of the permeable shell 340 may be compressed, causing the permeable shell to lengthen to a height greater than the height of the frustoconical expanded preset configuration 344.

The expanded preset configuration 344 of the permeable shell 340 may have a diameter at the first end 332 of about 4 mm, alternatively about 4.5 mm, alternatively about 5 mm, alternatively about 5.5 mm, alternatively about 6 mm, alternatively about 6.5 mm, alternatively about 7 mm. The expanded preset configuration 344 of the permeable shell 240 may have a diameter at the first end 332 between about 3 mm and about 7 mm, alternatively between about 4 mm and about 7 mm, alternatively between about 4 mm and about 6. The expanded preset configuration 344 of the permeable shell 340 may have a diameter at the second end 334 of about 6 mm, alternatively about 6.5 mm, alternatively about 7 mm, alternatively about 7.5 mm alternatively about 8 mm, alternatively about 9 mm, alternatively about 10 mm, alternatively about 11 mm. The expanded preset configuration 344 of the permeable shell 340 may have a diameter at the second end between about 5 mm and about 13 mm, alternatively between about 5 mm and about 12 mm, alternatively between about 6 mm and about 12 mm, alternatively between about 7 mm and about 12 mm, alternatively between about 7 mm and about 11 mm, alternatively between about 7 mm and about 10 mm.

The difference in length between the diameter of the second end 334 and the diameter of the first end 332 in the expanded preset configuration 344 may be at least about 1.0 mm, alternatively at least about 1.5 mm, alternatively at least about 2.0 mm, alternatively at least about 2.5 mm, alternatively at least about 3 mm, alternatively at least about 3.5 mm, alternatively at least about 4 mm, alternatively at least about 4.5 mm, alternatively at least about 5 mm. Alternatively, the difference in length between the diameter of the second end 334 and the diameter of the first end 332 in the expanded preset configuration 344 may be between about 0.5 mm to about 5.0 mm, alternatively between about 1.0 mm to about 5.0 mm, alternatively between about 1.5 mm to about 5.0 mm, alternatively between about 2.0 mm to about 5.0 mm, alternatively between about 2.5 mm to about 5.0 mm, alternatively between about 3.0 mm to about 5.0 mm, alternatively between about 2.0 mm to about 4.0 mm. A ratio of the diameter of the first end 332 to the diameter of the second end 334 may be between about 1:2 to about 1:6, alternatively between about 1:2 and about 1:5, alternatively between about 1:2 and about 1:4, alternatively about 1:2, alternatively about 1:3, alternatively about 1:4, alternatively about 1:5, alternatively about 1:6.

In some embodiments, the first end 332 may be the proximal end and the second end 334 may be the distal end, such that the proximal end of the device closer to the aneurysm neck has a smaller diameter than the distal end (see, e.g., FIG. 6A). In other embodiments, the second end may be the proximal end and the first end may be the distal end, such that the proximal end of the device closer to the aneurysm neck has a larger diameter than the distal end.

The expanded preset configuration 344 of the permeable shell 40 can have a height or length of about 2.6 mm, about 3 mm, about 3.6 mm, about 4 mm, about 4.6 mm, about 5 mm, about 5.6 mm, about 6 mm, about 6.6 mm, about 7 mm, about 7.6 mm, about 8 mm, about 8.6 mm, about 9 mm, about 9.6 mm, or about 10 mm. The woven structure of the filaments forming the mesh or braided portion 48 includes a plurality of openings in the mesh or braided portion 48 formed between the woven filaments. In some embodiments, the occlusive device 310 can be configured as an intrasaccular occlusive device that generally conforms to the shape of the treatment site.

Delivery and deployment of device embodiment 310 discussed herein may be carried out by first compressing the device 310 to a radially constrained and longitudinally flexible state. The device 310 may then be delivered to a desired treatment site, e.g., aneurysm 160, while disposed within the microcatheter 61, and then ejected or otherwise deployed from a distal end of the microcatheter. In other method embodiments, the microcatheter may first be navigated to a desired treatment site over a guidewire or by other suitable navigation techniques. The distal end of the microcatheter may be positioned such that a distal port of the microcatheter is directed towards or disposed within a vascular defect 160 to be treated and the guidewire withdrawn. The device 310 secured to a suitable delivery apparatus and in a radially constrained configuration, and having been inserted into a proximal portion of the inner lumen of the microcatheter, may be distally advanced to the vascular defect 160 through the inner lumen. Once disposed within the vascular defect 160, the device 310 may then be allowed to assume an expanded relaxed or partially relaxed state with the permeable shell 340 of the device spanning or partially spanning a portion of the vascular defect 160 or the entire vascular defect 160. The permeable shell 340 may assume a different expanded shape in the aneurysm than the expanded preset configuration, as the soft, flexible permeable shell may conform to the shape of the aneurysm 160 in which it is implanted. Once the device 310 and one or coils are deployed at a desired treatment site and the permeable shell 340 has been detached from the delivery device(s), the microcatheter may then be withdrawn.

Implants with Skirts

Figure 7:
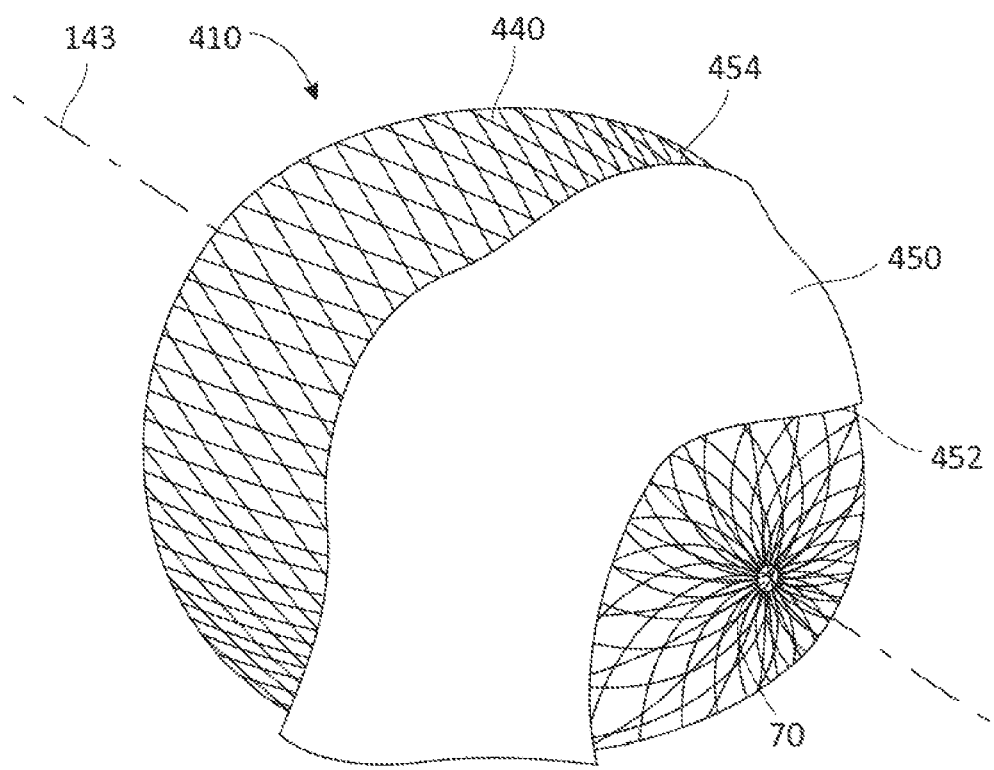
FIG. 7 shows a perspective view of an exemplary embodiment of a device for treatment of an aneurysm having an outer skirt.
Figure 8:
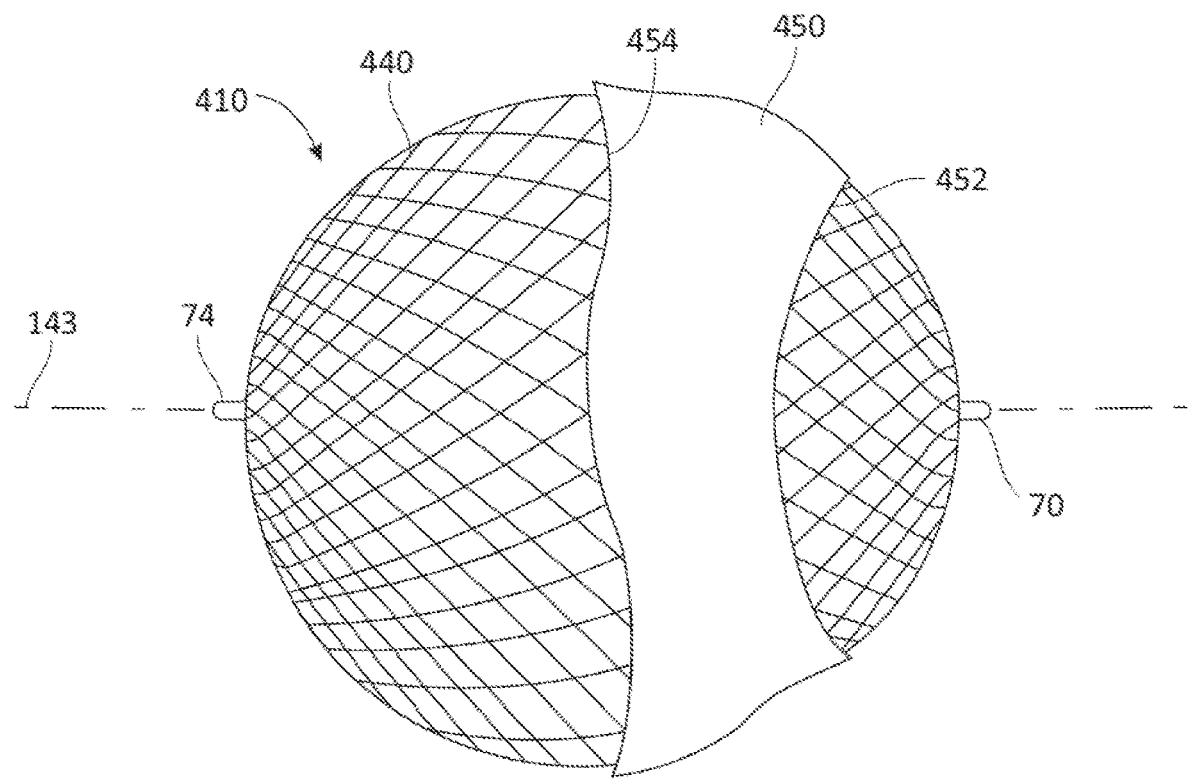
FIG. 8 shows a side view of an exemplary embodiment of a device for treatment of an aneurysm having an outer skirt.

FIGS. 7 and 8 depict an intrasaccular device 410 that has a permeable shell 140 made from a woven mesh of filaments. The permeable shell 440 has a proximal end, a distal end, a longitudinal axis 143, and comprises a plurality of elongate resilient filaments. The filaments have a woven structure and may be secured relative to each other at the proximal ends and distal ends of the permeable shell 440, or alternatively only at the proximal end of the permeable shell 440. The permeable shell 440 of the device 410 has a radially constrained elongated state configured for delivery within a microcatheter, with the thin woven filaments extending longitudinally from the proximal end to the distal end of each permeable shell radially adjacent each other along a length of the filaments. The permeable shell 440 has an expanded relaxed state with a globular and longitudinally shortened configuration relative to the radially constrained state. In the expanded state, the woven filaments form the self-expanding resilient permeable shell 440 in a smooth path radially expanded from a longitudinal axis of the permeable shell between the proximal end and distal end. The woven structure of the filaments forming the permeable shell includes a plurality of openings in the permeable shell 440 formed between the woven filaments. The braided mesh of the permeable shell 440 defines an interior cavity.

The expanded state of the permeable shell 440 may have a diameter of about 4 mm, alternatively about 5 mm, alternatively about 6 mm, alternatively about 7 mm, alternatively about 8 mm, alternatively about 9 mm, alternatively about 10 mm, alternatively about 11 mm. The expanded state of the permeable shell 440 may have a height or length of about 2.6 mm, about 3 mm, about 3.6 mm, about 4 mm, about 4.6 mm, about 5 mm, about 5.6 mm, about 6 mm, about 6.6 mm, about 7 mm, about 7.6 mm, about 8 mm, about 8.6 mm, about 9 mm, about 9.6 mm, or about 10 mm.

The permeable shell 440 may be made from a plurality of wires or filaments braided into a mesh, e.g., a tubular mesh. The permeable shell 440 may be made from about 96 to about 240 wires or filaments, alternatively about 96 to 180 wires or filaments, alternatively about 108 to about 180 wires or filaments, alternatively about 96 wires or filaments or more, alternatively about 108 wires or filaments or more, alternatively about 150 wires or filaments or more, alternatively about 180 wires or filaments or more. The diameter of the wires or filaments making up the exterior permeable shell 40 may be between about 0.0005" to about 0.00075", alternatively about 0.0004" to about 0.0008", alternatively about 0.0003" to about 0.0009", alternatively between about 0.00125" to about 0.002", alternatively about 0.001" to about 0.002", alternatively about 0.001" to about 0.003". Suitable materials and sizes of wires for constructing mesh implants are described in US 2017/0095254, US 2016/0249934, US 2016/0367260, US 2016/0249937, and US 2018/0000489, all of which are hereby expressly incorporated by reference in their entirety for all purposes.

Each of the filaments of the plurality of filaments making up the permeable shell 440 have a proximal and distal end. The proximal ends of the filaments of the permeable shell 440 may be gathered in a single proximal marker band 70. The device 410 can be attached to a delivery pusher 61 that is disposed within a catheter 243 by attaching the proximal marker band 70 to the distal end of the pusher 61. The distal ends of the plurality of filaments forming the exterior permeable shell 440 may be gathered in a distal marker band 74.

As seen in FIGS. 7-8, the device 410 may include an outer skirt 450 positioned around an outer surface of the permeable shell 440. The outer skirt 450 may have a proximal edge 452 secured to the permeable shell 440 at a first location, a distal edge 454 secured to the permeable shell 440 at a second location, and an intermediate portion between the proximal edge 452 and the distal edge 454. When the permeable shell 440 is in the expanded configuration, the intermediate portion of the outer skirt may include slack in the axial direction between the proximal edge 452 of the outer skirt 450 and the distal edge 454 of the outer skirt 450. When the permeable shell 440 is collapsed to the radially constrained configuration, the axial distance between the proximal edge 452 of the outer skirt 450 and the outflow edge 454 of the outer skirt 450 increases, reducing the slack in the outer skirt 450 in the axial direction.

In some embodiments, the outer skirt 450 may be annular and positioned around an outer surface of the frame. In other embodiments, as seen in FIG. 7, the outer skirt 450 may not include a hole or opening and may be a solid sheet of material. The outer skirt 450 may be laser cut or otherwise formed from a strong, durable piece of material, such as woven polyethylene terephthalate (PET), polytetrafluoroethylene, polyurethane, or other materials used for artificial vessels, although other synthetic or natural materials can be used. Alternatively, the outer skirt 450 may be made from a hydrogel material, as described in U.S. Pat. No. 9,451,963, which is hereby expressly incorporated by reference in its entirety for all purposes. In some embodiments, the outer skirt 450 may be formed from a copolymer of acrylamide monomer and poly(ethylene glycoldi-acrylamide). Alternatively, the outer skirt 450 may be made from a thin, flexible sheet of material, and can be made of any of various suitable materials, such as a fabric (e.g., polyethylene terephthalate (PET) (sold under the tradename Dacron®), ultra high molecular weight polyethylene (UHMWPE) (sold under the tradename Dyneema Purity®), etc.), tissue (e.g., pericardial tissue), metal, sponge, or polymer, as described in U.S. Pat. No. 6,730,118 and U.S. Publication No. 2021/0236279, which are hereby expressly incorporated by reference in their entireties for all purposes.

The outer skirt 450 may have a substantially straight proximal edge 452 and a distal edge 452 defining a plurality of alternating projections, notches, leaflets, scalloped edges. The proximal edge 452 of the outer skirt 450 can be bonded, sutured to, or otherwise coupled to a proximal region of the permeable shell 450. In some embodiments, the proximal edge 452 of the outer skirt 450 can be bonded, sutured to, or otherwise coupled to a proximal region of the permeable shell 450 and the distal edge 454 may not be bonded, sutured to, or otherwise coupled to an outer surface of the permeable shell 450. In some embodiments, the outer skirt 450 may be coupled to the permeable shell 440 through single attachment site. In some embodiments, the single attachment site may be a single node, single stitch, a single suture, a single adhesive coupling, or other methods of attachment well known in the art. In some embodiments, the outer skirt 450 may be situated at a shoulder of the permeable shell to cover a portion of the permeable shell having a higher porosity or a thinner mesh area.

In some embodiments, the outer skirt 450 may be coupled to the permeable shell 440 at or near the proximal end, for example, the outer skirt 450 may be coupled to the permeable shell 440 at or near a proximal hub 70. Alternatively, the outer skirt 450 may be coupled to the permeable shell 440 at a height about between 5% and about 20%, alternatively between about 5% and about 15%, alternatively between about 5% and about 10% of the total height of the permeable shell 440 in its expanded configuration.

As can be seen in FIGS. 7 and 8, the outer skirt 450 may be secured to the permeable shell 440 such that when the frame is in its expanded state, there is excess material or slack between the outer skirt's proximal and distal edges 452, 454 that does not lie flat against the outer surface of the permeable shell 440. In some embodiments, the outer skirt 450 may be configured with excess material that causes the outer skirt 450 to bulge outwardly as the permeable shell 440 axially shortens (i.e., shortens in length) during radial expansion. Accordingly, when the permeable shell 440 is deployed within the aneurysm, the excess material of the outer skirt 450 may fill in gaps between the permeable shell 440 and the surrounding aneurysm wall to assist in forming a good fluid-tight seal between the permeable shell 440 and the aneurysm wall, e.g., at the neck of the aneurysm. The outer skirt 450 may provide a seal to avoid leakage after implantation of the device 410 around the edges of the device 410 at the orifice of the neck of the aneurysm.

Figure 9A:
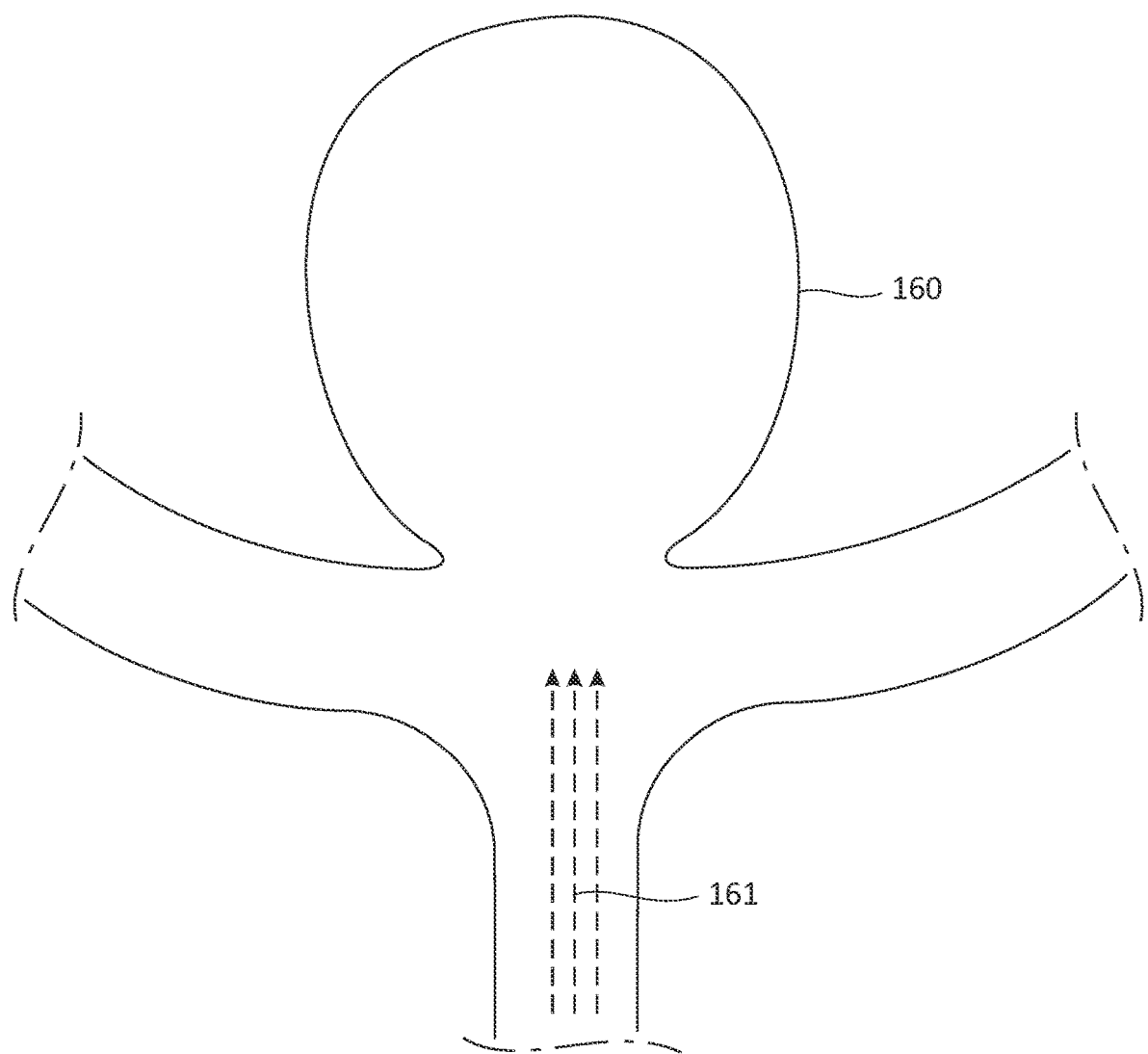
FIG. 9A shows an exemplary wide neck bifurcation aneurysm.
Figure 9B:
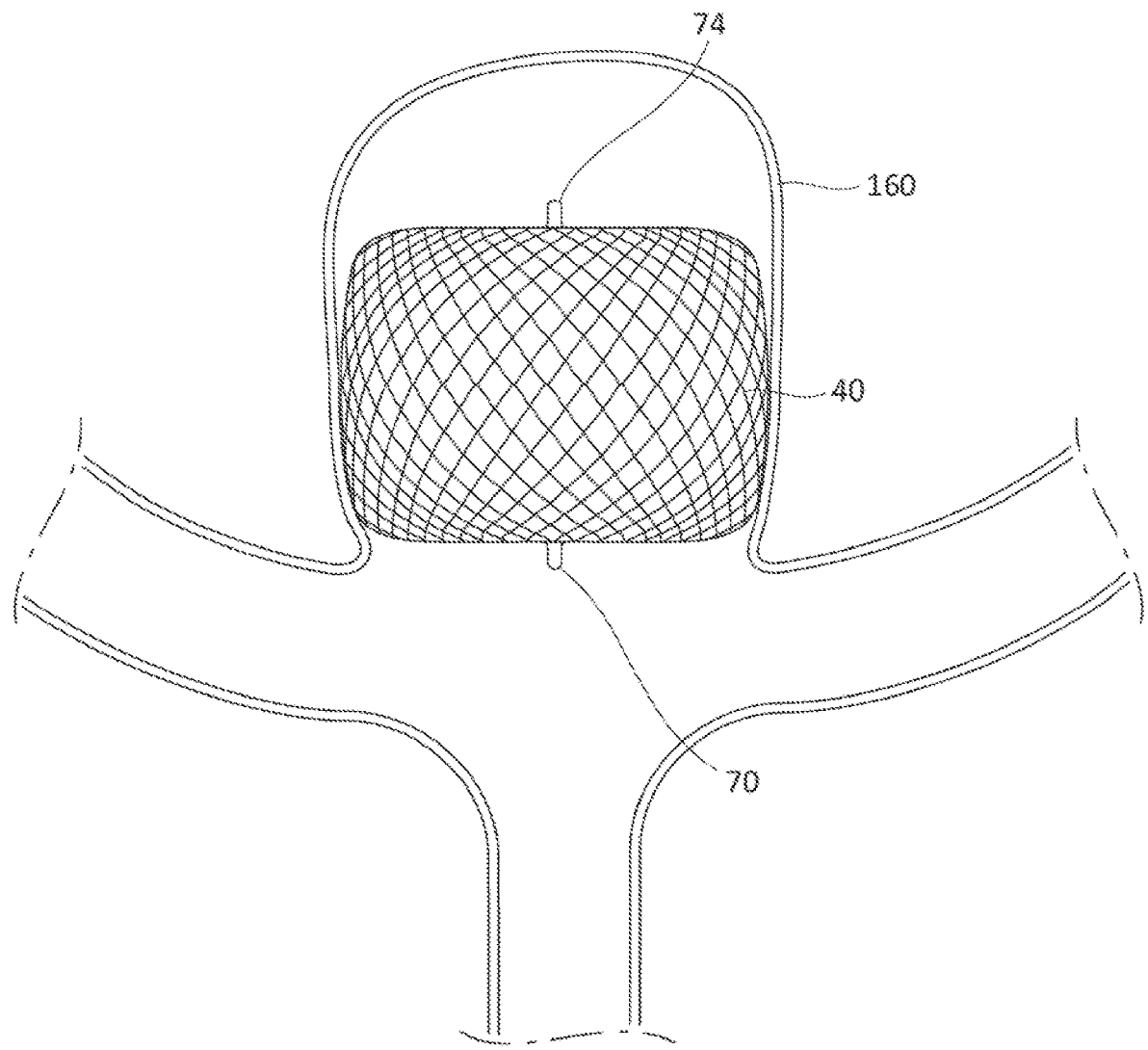
FIG. 9B shows an exemplary device implanted within wide neck bifurcation aneurysm.

FIG. 9A shows an exemplary wide neck aneurysm 160 located at a bifurcation of two vessels. Blood flow 161 comes from the bottom vessel, resulting in jet flow into the aneurysm 160. High blood pressure may cause formation of the aneurysm 160. Moreover, the bifurcation increases the risk of recurrence when treated with coil embolization. FIG. 9B shows an exemplary mesh permeable shell 40 disposed in the interior cavity of the aneurysm 160.

Figure 10A:
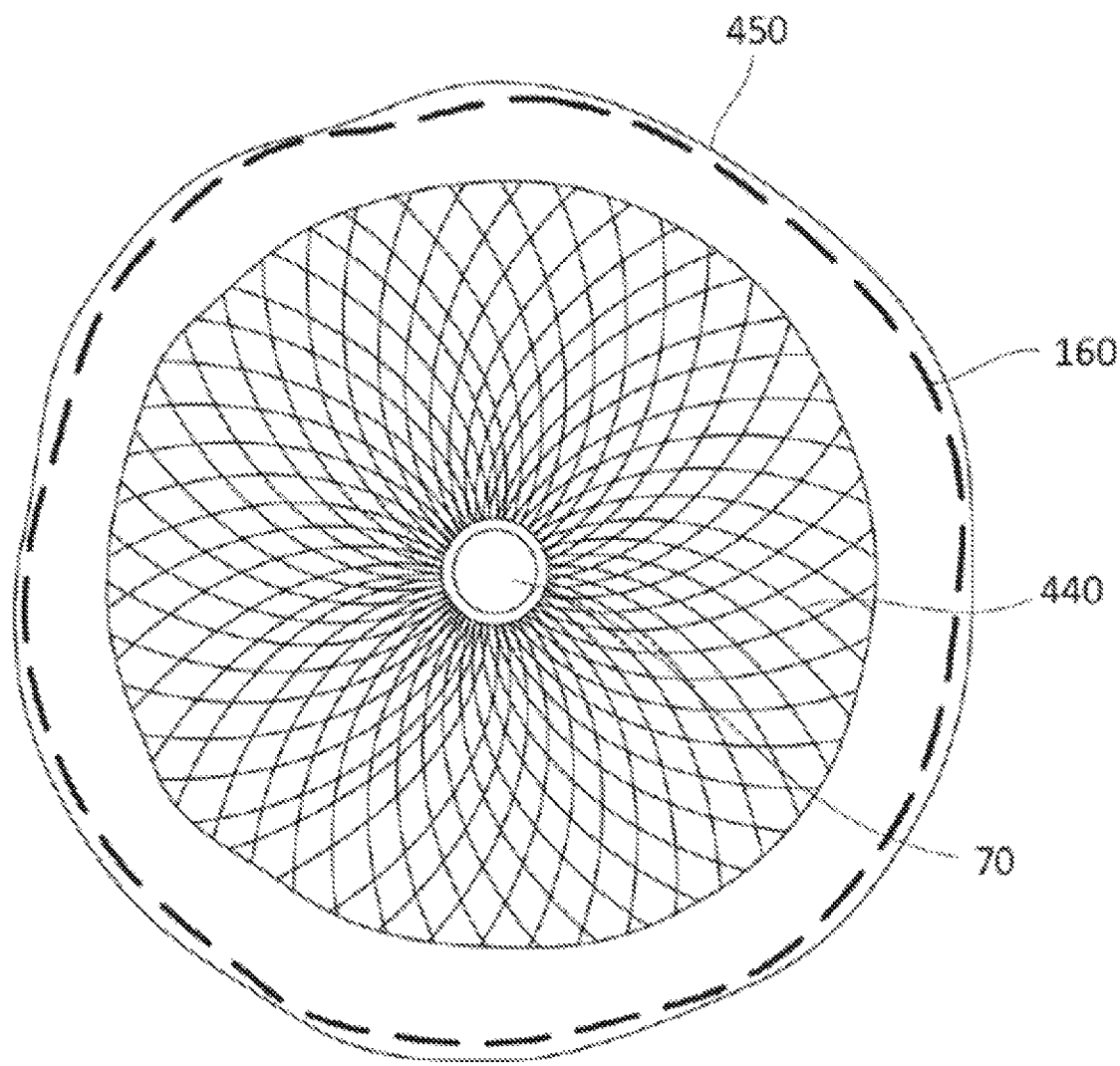
FIG. 10A shows a bottom view of an exemplary device having an outer skirt implanted within an aneurysm cavity.
Figure 10B:
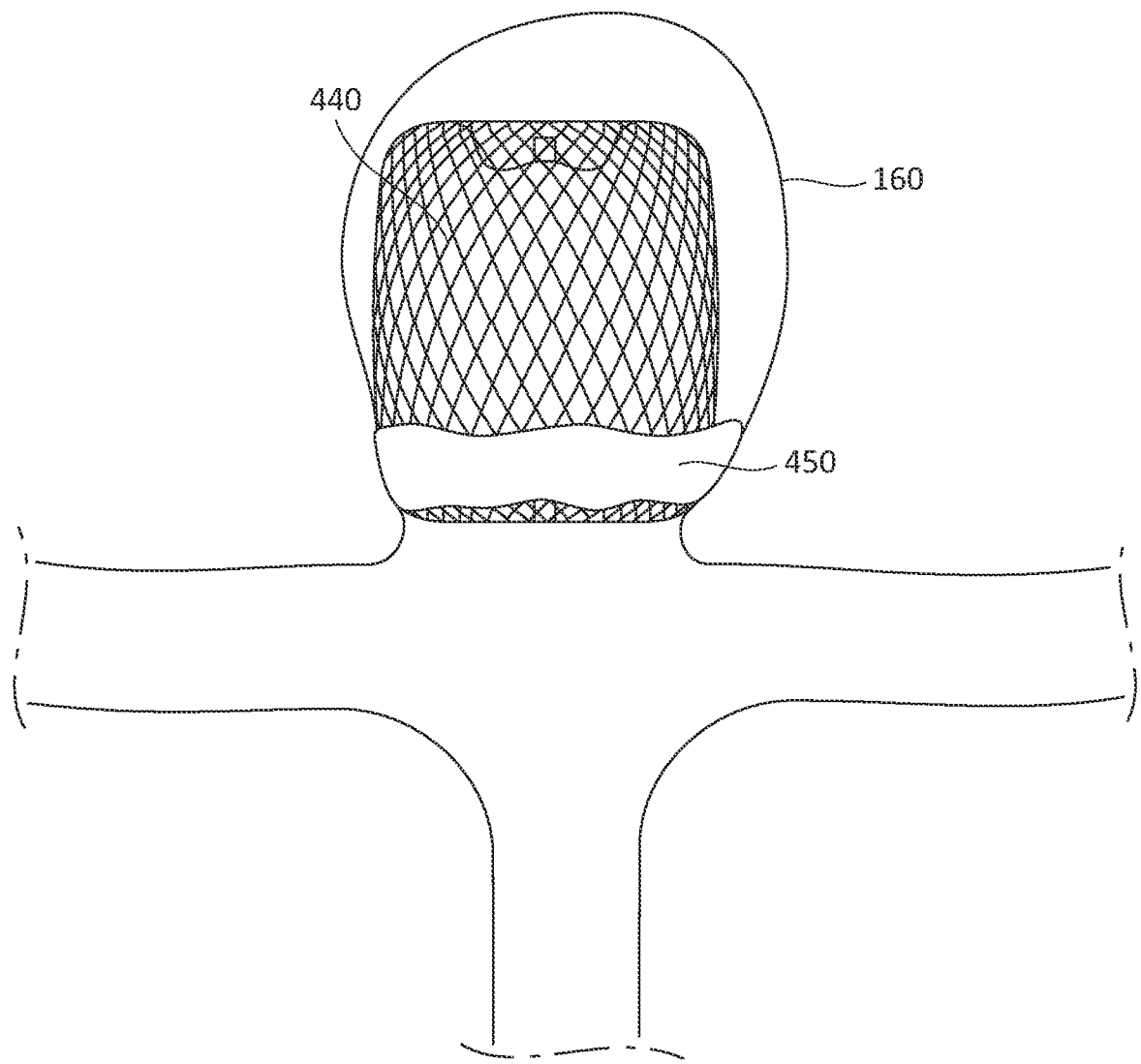
FIG. 10 shows a side view of an exemplary embodiment of a device having an outer skirt within an aneurysm cavity.

FIGS. 10A and 10B depict a bottom view and side view, respectively, of the device 410 implanted in the aneurysm 160. The outer skirt 450 of the device 410 fills in gaps between the permeable shell 440 and the surrounding wall of the aneurysm 460 to assist in forming a good fluid-tight seal between the permeable shell 440 and the aneurysm wall, e.g., at the neck of the aneurysm 160. As seen in FIG. 10B, after deployment of the permeable shell 440, the outer skirt 450 settle or gather around a perimeter of the permeable shell 440 near the proximal end of the permeable shell 440, such that the outer skirt 450 may fill in gaps between the permeable shell 440 and the surrounding wall of the aneurysm 160.

As seen in FIG. 10B, once deployed, the majority of the outer skirt 450 may be positioned to extend beyond one end of the permeable shell 440 (e.g., the proximal end of the inflow end closest to the orifice of the neck of the aneurysm) such that there is minimal overlap between the outer skirt 450 and the permeable shell 440 in the axial (or longitudinal) direction. In some embodiments, less than 50% of the axial length (measured from the proximal, inflow end to the distal, outflow end) of the outer skirt 450 overlaps the permeable shell 440; in other embodiments less than 25% of the axial length of the outer skirt 450 overlaps the permeable shell 440; in other embodiments less than 10% of the axial length of the outer skirt 450 overlaps the permeable shell 440; and in other embodiments less 5% of the axial length of the outer skirt 450 overlaps the permeable shell 440. In some embodiments, there may be no or very little amount of outer skirt 450 material positioned around the proximal end portion of the permeable frame 140.

Figure 11:
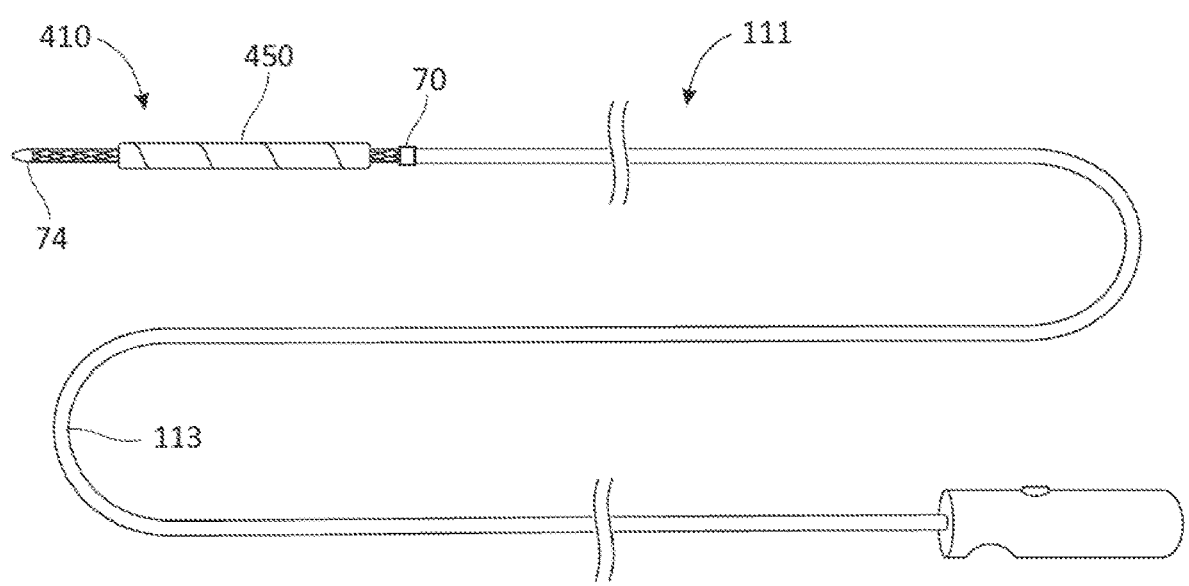
FIG. 11 shows an exemplary system for delivery of a device for treatment of an aneurysm having an outer skirt.

FIG. 11 shows an exemplary delivery system for the device 410. The device 410 may be attached to a delivery pusher, such as a pusher wire. The proximal marker band of the proximal most permeable shell may be attached to the distal end of the delivery pusher. The device may be delivered through a microcatheter, e.g., a catheter with an inner delivery lumen sized between about 0.017 inches and about 0.027 inches, to ensure a smooth, low profile delivery. Delivery can be accomplished as described in other publications, which have been expressly incorporated by reference in their entirety, and also as described below. In some embodiments, delivery and deployment of device 410 discussed herein may be carried out by first compressing the device 410 to a radially constrained and longitudinally flexible state. The device 410 may then be delivered to a desired treatment site 160 while disposed within the microcatheter, and then ejected or otherwise deployed from a distal end of the microcatheter. In other method embodiments, the microcatheter may first be navigated to a desired treatment site 160 over a guidewire or by other suitable navigation techniques. The distal end of the microcatheter may be positioned such that a distal port of the microcatheter is directed towards or disposed within a vascular defect 160 to be treated and the guidewire withdrawn. The device 410 secured to a suitable delivery apparatus 111 may then be radially constrained, inserted into a proximal portion of the inner lumen of the microcatheter and distally advanced to the vascular defect 160 through the inner lumen.

The device 410 may be attached to a delivery pusher 113. A proximal marker band of the permeable shell 440 may be attached to the distal end of the delivery pusher 113. The device may be delivered through a microcatheter, e.g., a catheter with an inner delivery lumen sized between about 0.017 inches and about 0.027 inches, to ensure a smooth, low profile delivery. Delivery can be accomplished as described in other publications, which have been expressly incorporated by reference in their entirety, and also as described below and elsewhere with respect to other embodiments.

Figure 12A:
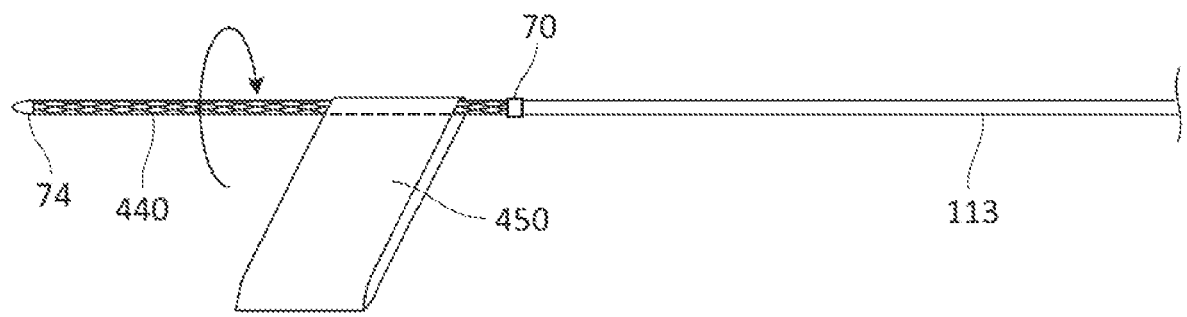
FIGS. 12A-12D show steps of a process for delivering an exemplary device having an outer skirt.
Figure 12B:
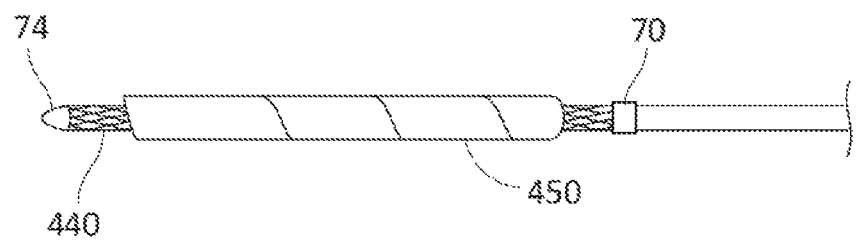
Figure 12C:
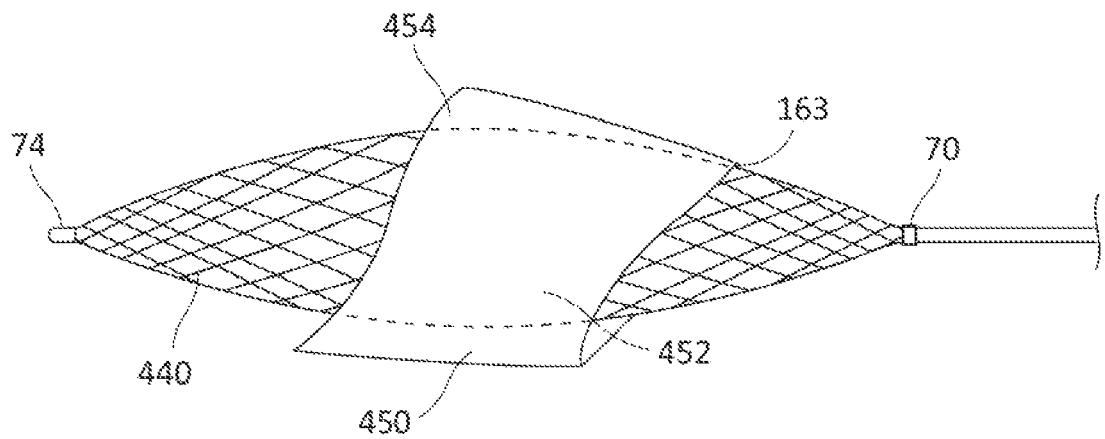
Figure 12D:
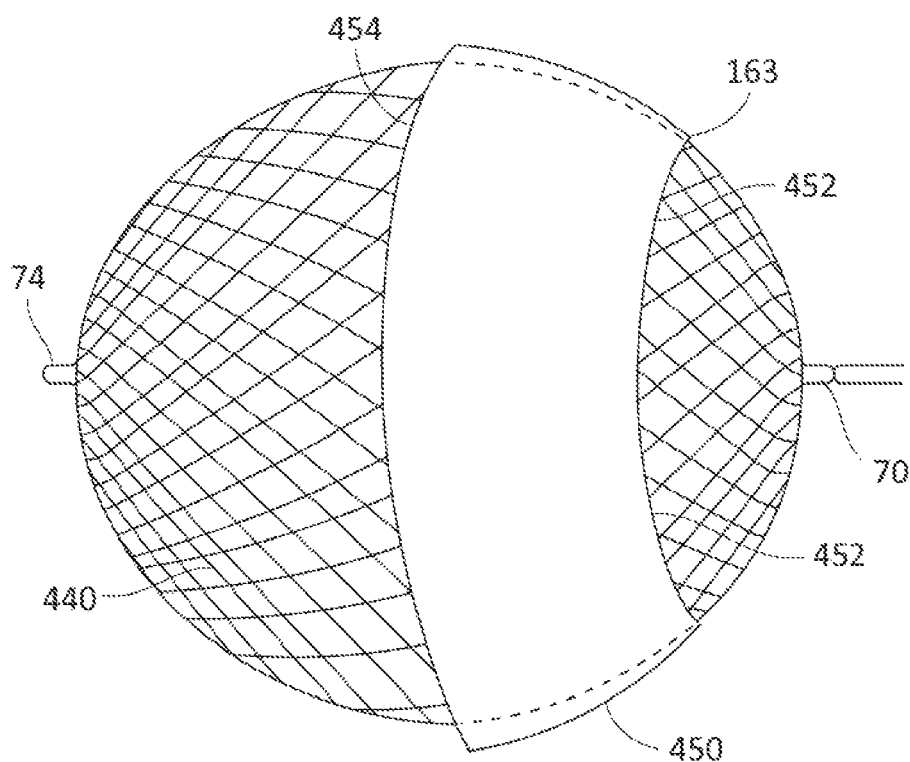

FIGS. 12A-12D illustrate different stages of the device 410 during delivery. In FIG. 12A, the outer skirt 450 may be wrapped around the permeable shell 140 while it is in a radially constrained state. In some embodiments, the outer skirt 450 may be attached to the permeable shell 440 using one, alternatively 2, alternatively 3, alternatively 4, alternatively 5, alternatively between about 1 and about 10, alternatively between about 1 and about 5 stitches or sutures. As seen in FIG. 12B, the outer skirt 450 may be soft enough to wrap around the permeable shell 440 in its elongated, radially constrained configuration. The wrapped configuration may be maintained during delivery within the microcatheter. As seen in FIG. 12C, when the device 410 exits the distal end of the microcatheter, the outer skirt 450 may freely move around the permeable shell 440. The outer skirt 450 and the shell 440 may only be coupled together at a single node 163 located at or near the proximal edge 452. As seen in FIG. 12D, when the permeable shell 440 is fully deployed in its expanded configuration, the outer skirt 450 may cover a proximal region of the permeable shell 440 to prevent blood flow into the aneurysm orifice.

Figure 13:
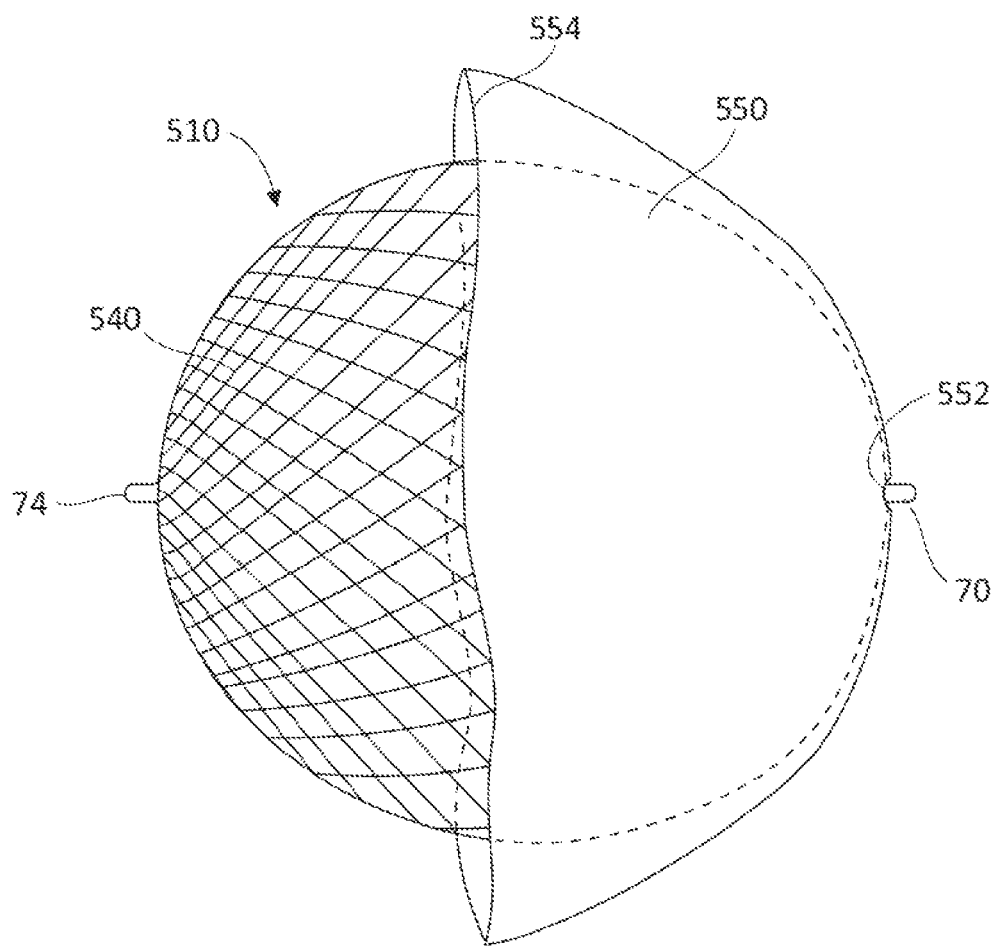
FIG. 13 shows an alternative exemplary device having an outer skirt.
Figure 14:
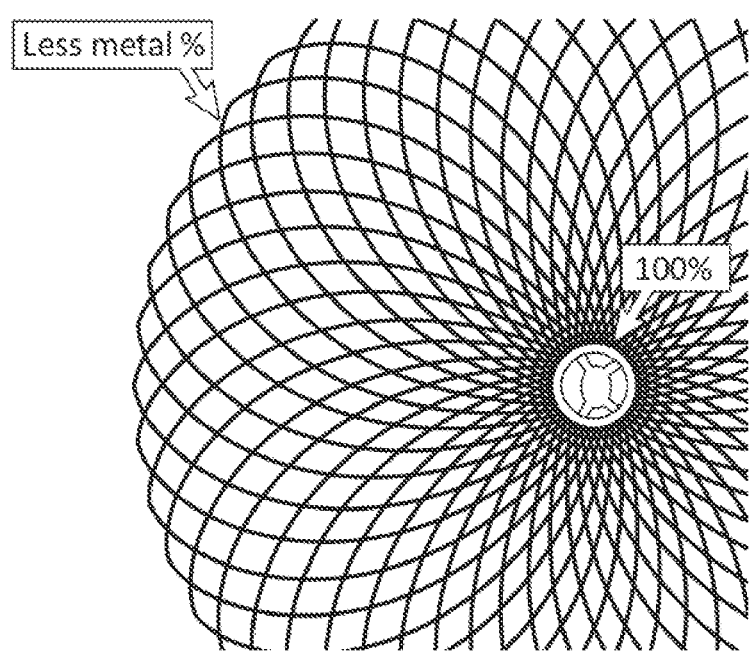
FIG. 14 shows a bottom view of a mesh implant.

In another embodiment, as seen in FIG. 13, the device 510 has an outer skirt 550 that may have a small proximal opening at the proximal end sized to fit tightly around a proximal hub 70 of the device 510. The outer skirt 550 may be secured to the permeable shell 540 only near the proximal hub such that when the frame is in its expanded state, there is excess material or slack between the outer skirt's proximal and distal edges 552, 554 that does not lie flat against the outer surface of the permeable shell 540. In some embodiments, the outer skirt 550 may be configured with excess material that causes the outer skirt 550 to bulge outwardly as the permeable shell 540 axially shortens (i.e., shortens in length) during radial expansion. Accordingly, when the permeable shell 540 is deployed within the aneurysm, the excess material of the outer skirt 550 can fill in gaps between the permeable shell 540 and the surrounding aneurysm wall to assist in forming a good fluid-tight seal between the permeable shell 540 and the aneurysm wall, e.g., at the neck of the aneurysm. The outer skirt 550 may provide a seal to avoid leakage after implantation of the device 510 around the edges of the device 510 at the orifice of the neck of the aneurysm.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible. The embodiments described herein are restated and expanded upon in the following paragraphs without explicit reference to the figures.

In many embodiments, the device includes a permeable shell having a proximal cavity or pocket in which an additional embolic device may be inserted. The proximal cavity may be relatively small, but wide in relation to the aneurysm neck, such that it could be quickly filled with an additional embolic material, such as one or more coils. Such a device may facilitate compatibility with smaller microcatheters for certain sized implants and/or lead to improved clinical effectiveness. The device may be made from a plurality of filaments configured in a woven mesh. The permeable shell may have sufficient radial strength to resist compaction and sufficient metal surface area to prevent prolapsing of the coils or other filling devices into the parent vessel.

In many embodiments, device for treatment of a patient's cerebral aneurysm includes a permeable shell having a proximal end, a distal end, an outer surface, an inner surface, a radially constrained elongated state configured for delivery within a catheter lumen, an expanded state with a longitudinally shortened configuration relative to the radially constrained state, and a plurality of elongate filaments that are woven together to form a mesh, the expanded state having an exterior cavity defined by the outer surface of the permeable shell, wherein the exterior cavity comprises an opening communicating with a chamber, wherein a maximum length of the opening is smaller than a maximum length of the chamber.

In some embodiments, the expanded state further comprises an interior cavity defined by the inner surface of the permeable shell.

In some embodiments, the exterior cavity is defined by the outer surface of a proximal region of the permeable shell.

In some embodiments, the exterior cavity is located at the proximal end of the permeable shell.

In some embodiments, the maximum length of the opening is a diameter of the opening.

In some embodiments, the maximum length of the chamber is a diameter of the chamber.

In some embodiments, the chamber has a cylindrical portion.

In some embodiments, the device further includes a distal hub attached to a distal end of the permeable shell.

In some embodiments, the device further includes a proximal hub attached to a proximal end of the permeable shell. In some embodiments, the proximal hub is located in the chamber of the exterior cavity. In some embodiments, the proximal hub is coupled to a pusher.

In some embodiments, the device further includes an additional embolic material deployed in the chamber of the cavity.

In some embodiments, the device further includes one or more coils deployed in the chamber of the cavity. In some embodiments, the one or more coils comprise hydrogel. In some embodiments, a distal end of the one or more coils is coupled to a proximal end of the proximal hub. In some embodiments, a proximal end of the one or more coils is coupled to a pusher.

In some embodiments, the plurality of filaments comprises between about 28 and about 96 filaments.

In some embodiments, the plurality of filaments comprises between about 48 and about 72 filaments.

In some embodiments, each of the plurality of filaments comprises a diameter of between about 0.0015" and about 0.002".

In many embodiments, a method for treating a cerebral aneurysm having an interior cavity and a neck includes the steps of: advancing an implant in a microcatheter to a region of interest in a cerebral artery, wherein the implant comprises: a permeable shell having a proximal end, a distal end, an outer surface, an inner surface, a radially constrained elongated state configured for delivery within a catheter lumen, an expanded state with a longitudinally shortened configuration relative to the radially constrained state, and a plurality of elongate filaments that are woven together to form a mesh, the expanded state having an exterior cavity defined by the outer surface of the permeable shell, wherein the exterior cavity comprises an opening communicating with a chamber, wherein a maximum length of the opening is smaller than a maximum length of the chamber; deploying the permeable shell within the cerebral aneurysm, wherein the permeable shell expands to the expanded state in the interior cavity of the aneurysm; and withdrawing the microcatheter from the region of interest.

In some embodiments, the method further includes the step of deploying additional embolic material into the exterior cavity of the permeable shell.

In some embodiments, the method further includes the step of deploying one or more coils into the exterior cavity of the permeable shell. In some embodiments, the one or more coils are coupled to the permeable shell. In some embodiments, the implant further comprises a proximal hub attached to a proximal end of the permeable shell. In some embodiments, a distal end of the one or more coils is coupled to a proximal end of the proximal hub of the implant. In some embodiments, the microcatheter is withdrawn after the one or more coils are deployed into the exterior cavity of the permeable shell. In some embodiments, the one or more coils comprise hydrogel.

In some embodiments, the plurality of filaments comprises between about 28 and about 96 filaments.

In some embodiments, the plurality of filaments comprises between about 48 and about 72 filaments.

In some embodiments, each of the plurality of filaments comprises a diameter of between about 0.0015" and about 0.002".

In some embodiments, the expanded state further comprises an interior cavity defined by the inner surface of the permeable shell.

In some embodiments, the exterior cavity is defined by the outer surface of a proximal region of the permeable shell.

In some embodiments, the exterior cavity is located at the proximal end of the permeable shell.

In some embodiments, the maximum length of the opening is a diameter of the opening.

In some embodiments, the maximum length of the chamber is a diameter of the chamber.

In some embodiments, the chamber has a cylindrical portion.

In many embodiments, a device for treatment of a patient's cerebral aneurysm includes a permeable shell having a plurality of elongate filaments that are woven together to form a mesh, the permeable shell having a first end, a second end, a radially constrained elongated configuration for delivery within a catheter lumen, and an expanded preset configuration with a longitudinally shortened configuration relative to the radially constrained state, wherein in the expanded preset configuration, a diameter of the first end is smaller than a diameter of the second end.

In some embodiments, the expanded preset configuration has a frustoconical shape.

In some embodiments, the expanded preset configuration has a cross-sectional shape of a trapezoid.

In some embodiments, the first end is the proximal end and the second end is the distal end.

In some embodiments, the first end is the distal end and the second end is the proximal end.

In some embodiments, the difference between the diameter of the second end and the diameter of the first end in the expanded preset configuration is between about 1.0 mm to about 5.0 mm.

In some embodiments, a ratio of the diameter of the first end to the diameter of the second end may is between about 1:2 to about 1:6.

In some embodiments, the diameter of the first end is between about 4 mm and about 7 mm.

In some embodiments, the diameter of the second end is between about 7 mm and about 12 mm.

In some embodiments, the permeable shell is configured to assume an expanded state after deployment into the patient's cerebral aneurysm, wherein a shape of the expanded state is different than a shape of the expanded preset configuration.

In many embodiments, a method for treating a cerebral aneurysm having an interior cavity and a neck includes the steps of: advancing an implant in a microcatheter to a region of interest in a cerebral artery, wherein the implant comprises: a permeable shell having a plurality of elongate filaments that are woven together to form a mesh, the permeable shell having a first end, a second end, a radially constrained elongated configuration for delivery within a catheter lumen, and an expanded preset configuration with a longitudinally shortened configuration relative to the radially constrained state, wherein in the expanded preset configuration, a diameter of the first end is smaller than a diameter of the second end; deploying the implant within the cerebral aneurysm, wherein the permeable shell expands to an expanded state in the interior cavity of the aneurysm, wherein the expanded state is different from the expanded preset configuration; and withdrawing the microcatheter from the region of interest after deploying the implant.

In some embodiments, the expanded preset configuration has a frustoconical shape.

In some embodiments, the expanded preset configuration has a cross-sectional shape of a trapezoid.

In some embodiments, a shape of the expanded preset configuration is different than a shape of the expanded state.

In some embodiments, the expanded state in the interior cavity has a height that is longer than a height of the expanded preset configuration.

In some embodiments, the expanded state in the interior cavity has a diameter that is smaller than the diameter of the second end in the expanded preset configuration.

In some embodiments, the first end is the proximal end and the second end is the distal end.

In some embodiments, the first end is the distal end and the second end is the proximal end.

In some embodiments, the difference between the diameter of the second end and the diameter of the first end in the expanded preset configuration is between about 1.0 mm to about 5.0 mm.

In some embodiments, a ratio of the diameter of the first end to the diameter of the second end may is between about 1:2 to about 1:6.

In some embodiments, the diameter of the first end is between about 4 mm and about 7 mm.

In some embodiments, the diameter of the second end is between about 7 mm and about 12 mm.

In many embodiments, a device for treatment of a patient's cerebral aneurysm includes: a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening, wherein the outer skirt is coupled to the permeable shell at one node or a plurality of nodes.

In some embodiments, the distal edge of the outer skirt is not coupled to the permeable shell.

In some embodiments, the at least one node is located at or near the proximal edge of the outer skirt.

In some embodiments, the at least one node is a suture or a stitch.

In some embodiments, the at least one node couples the outer skirt and the permeable shell with adhesive.

In some embodiments, the outer skirt is coupled to an outer surface of the permeable shell at the at least one node.

In some embodiments, the at least one node is located in a proximal region of the permeable shell.

In some embodiments, the outer skirt is configured to bulge radially outwardly during radial expansion of the permeable shell to the expanded state.

In some embodiments, the at least one node is located at the proximal end of the permeable shell.

In some embodiments, the outer skirt comprises polyethylene terephthalate.

In some embodiments, each of the plurality of elongate filaments have a proximal and distal end, wherein the proximal ends of the plurality of filaments are gathered in a proximal hub, and wherein the proximal edge of the outer skirt surrounds the proximal hub. In some embodiments, the proximal hub is a proximal marker band. In some embodiments, the distal ends of the plurality of filaments are gathered in a distal hub. In some embodiments, the distal hub is a distal marker band.

In some embodiments, the device further includes a pusher wire detachably coupled to the proximal end of the permeable shell.

In many embodiments, a method for treating a cerebral aneurysm having an interior cavity and a neck includes the steps of: advancing an implant in a microcatheter to a region of interest in a cerebral artery, wherein the implant comprises: a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening, wherein the outer skirt is coupled to the permeable shell at one node or a plurality of nodes; deploying the implant within the cerebral aneurysm, wherein the permeable shell expands to its expanded state in the interior cavity of the aneurysm, wherein the outer skirt fills a gap between the permeable shell and a wall of the cerebral aneurysm; and withdrawing the microcatheter from the region of interest after deploying the implant.

In some embodiments, the outer skirt fills a gap between the permeable shell and the wall of the cerebral aneurysm near a neck of the aneurysm.

In some embodiments, the distal edge of the outer skirt is not coupled to the permeable shell.

In some embodiments, the at least one node is located at or near the proximal edge of the outer skirt.

In some embodiments, the at least one node is a suture or a stitch.

In some embodiments, the at least one node couples the outer skirt and the permeable shell with adhesive.

In some embodiments, the outer skirt is coupled to an outer surface of the permeable shell at the at least one node.

In some embodiments, the at least one node is located in a proximal region of the permeable shell.

In some embodiments, the outer skirt is configured to bulge radially outwardly during radial expansion of the permeable shell to the expanded state.

In some embodiments, the at least one node is located at the proximal end of the permeable shell.

In some embodiments, the outer skirt comprises polyethylene terephthalate.

In some embodiments, each of the plurality of elongate filaments have a proximal and distal end, wherein the proximal ends of the plurality of filaments are gathered in a proximal hub, and wherein the proximal edge of the outer skirt surrounds the proximal hub. In some embodiments, the proximal hub is a proximal marker band. In some embodiments, the distal ends of the plurality of filaments are gathered in a distal hub. In some embodiments, the distal hub is a distal marker band.

In some embodiments, the device further includes a pusher wire detachably coupled to the proximal end of the permeable shell, and the method further includes the step of detaching the implant from the pusher wire before the step of withdrawing the microcatheter from the region of interest. In some embodiments, the method further includes the step of withdrawing the pusher wire from the region of interest through the microcatheter.

In many embodiments, a method for treating a cerebral aneurysm having an interior cavity and a neck includes the steps of: advancing an implant in a microcatheter to a region of interest in a cerebral artery, wherein the implant comprises: a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening, wherein the outer skirt is coupled to the permeable shell at one node or a plurality of nodes, and wherein the proximal end of the permeable shell is detachably coupled to a pusher wire; deploying the implant within the cerebral aneurysm, wherein the permeable shell expands to its expanded state in the interior cavity of the aneurysm, wherein the outer skirt fills a gap between the permeable shell and a wall of the cerebral aneurysm; detaching the implant from the pusher wire, and withdrawing the pusher wire from the region of interest through the microcatheter after deploying the implant.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

Aspects of the invention are set out in the independent claims and preferred features are set out in the dependent claims. The preferred features of the dependent claims may be provided in combination in a single embodiment and preferred features of one aspect may be provided in conjunction with other aspects.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

Clauses

Exemplary embodiments are set out in the following numbered clauses.

Clause 1. A device for treatment of a patient's cerebral aneurysm, comprising:
 a permeable shell having a proximal end, a distal end, an outer surface, an inner surface, a radially constrained elongated state configured for delivery within a catheter lumen, an expanded state with a longitudinally shortened configuration relative to the radially constrained state, and a plurality of elongate filaments that are woven together to form a mesh, the expanded state having an exterior cavity defined by the outer surface of the permeable shell, wherein the exterior cavity comprises an opening communicating with a chamber, wherein a maximum length of the opening is smaller than a maximum length of the chamber.

Clause 2. The device of clause 1, wherein the expanded state further comprises an interior cavity defined by the inner surface of the permeable shell.

Clause 3. The device of clause 1, wherein the exterior cavity is defined by the outer surface of a proximal region of the permeable shell.

Clause 4. The device of clause 1, wherein the exterior cavity is located at the proximal end of the permeable shell.

Clause 5. The device of clause 1, wherein the maximum length of the opening is a diameter of the opening.

Clause 6. The device of clause 1, wherein the maximum length of the chamber is a diameter of the chamber.

Clause 7. The device of clause 1, wherein the chamber has a cylindrical portion.

Clause 8. The device of clause 1, further comprising a distal hub attached to a distal end of the permeable shell.

Clause 9. The device of clause 1, further comprising a proximal hub attached to a proximal end of the permeable shell.

Clause 10. The device of clause 9, wherein the proximal hub is located in the chamber of the exterior cavity.

Clause 11. The device of clause 9, wherein the proximal hub is coupled to a pusher.

Clause 12. The device of clause 1, further comprising an additional embolic material deployed in the chamber of the cavity.

Clause 13. The device of clause 1, further comprising one or more coils deployed in the chamber of the cavity.

Clause 14. The device of clause 13, wherein the one or more coils comprise hydrogel.

Clause 15. The device of clause 13, wherein a distal end of the one or more coils is coupled to a proximal end of the proximal hub.

Clause 16. The device of clause 13, wherein a proximal end of the one or more coils is coupled to a pusher.

Clause 17. The device of clause 1, wherein the plurality of filaments comprises between about 28 and about 96 filaments.

Clause 18. The device of clause 1, wherein the plurality of filaments comprises between about 48 and about 72 filaments.

Clause 19. The device of clause 1, wherein each of the plurality of filaments comprises a diameter of between about 0.0015" and about 0.002".

Clause 20. A method for treating a cerebral aneurysm having an interior cavity and a neck, comprising the steps of:
 advancing an implant in a microcatheter to a region of interest in a cerebral artery, wherein the implant comprises:

a permeable shell having a proximal end, a distal end, an outer surface, an inner surface, a radially constrained elongated state configured for delivery within a catheter lumen, an expanded state with a longitudinally shortened configuration relative to the radially constrained state, and a plurality of elongate filaments that are woven together to form a mesh, the expanded state having an exterior cavity defined by the outer surface of the permeable shell, wherein the exterior cavity comprises an opening communicating with a chamber, wherein a maximum length of the opening is smaller than a maximum length of the chamber;

deploying the permeable shell within the cerebral aneurysm, wherein the permeable shell expands to the expanded state in the interior cavity of the aneurysm; and withdrawing the microcatheter from the region of interest.

Clause 21. The method of clause 20, further comprising the step of deploying additional embolic material into the exterior cavity of the permeable shell.

Clause 22. The method of clause 20, further comprising the step of deploying one or more coils into the exterior cavity of the permeable shell.

Clause 23. The method of clause 22, wherein the one or more coils are coupled to the permeable shell.

Clause 24. The method of clause 23, wherein the implant further comprises a proximal hub attached to a proximal end of the permeable shell.

Clause 25. The method of clause 24, wherein a distal end of the one or more coils is coupled to a proximal end of the proximal hub of the implant.

Clause 26. The method of clause 22, wherein the microcatheter is withdrawn after the one or more coils are deployed into the exterior cavity of the permeable shell.

Clause 27. The method of clause 22, wherein the one or more coils comprise hydrogel.

Clause 28. The method of clause 20, wherein the plurality of filaments comprises between about 28 and about 96 filaments.

Clause 29. The method of clause 20, wherein the plurality of filaments comprises between about 48 and about 72 filaments.

Clause 30. The method of clause 20, wherein each of the plurality of filaments comprises a diameter of between about 0.0015" and about 0.002".

Clause 31. The method of clause 20, wherein the expanded state further comprises an interior cavity defined by the inner surface of the permeable shell.

Clause 32. The method of clause 20, wherein the exterior cavity is defined by the outer surface of a proximal region of the permeable shell.

Clause 33. The method of clause 20, wherein the exterior cavity is located at the proximal end of the permeable shell.

Clause 34. The method of clause 20, wherein the maximum length of the opening is a diameter of the opening.

Clause 35. The method of clause 20, wherein the maximum length of the chamber is a diameter of the chamber.

Clause 36. The method of clause 20, wherein the chamber has a cylindrical portion.

Clause 37. A device for treatment of a patient's cerebral aneurysm, comprising:
a permeable shell having a plurality of elongate filaments that are woven together to form a mesh, the permeable shell having a first end, a second end, a radially constrained elongated configuration for delivery within a catheter lumen, and an expanded preset configuration with a longitudinally shortened configuration relative to the radially constrained state, wherein in the expanded preset configuration, a diameter of the first end is smaller than a diameter of the second end.

Clause 38. The device of clause 37, wherein the expanded preset configuration has a frustoconical shape.

Clause 39. The device of clause 37, wherein the expanded preset configuration has a cross-sectional shape of a trapezoid.

Clause 40. The device of clause 37, wherein the first end is the proximal end and the second end is the distal end.

Clause 41. The device of clause 37, wherein the first end is the distal end and the second end is the proximal end.

Clause 42. The device of clause 37, wherein the difference between the diameter of the second end and the diameter of the first end in the expanded preset configuration is between about 1.0 mm to about 5.0 mm.

Clause 43. The device of clause 37, wherein a ratio of the diameter of the first end to the diameter of the second end may is between about 1:2 to about 1:6.

Clause 44. The device of clause 37, wherein the diameter of the first end is between about 4 mm and about 7 mm.

Clause 45. The device of clause 37, wherein the diameter of the second end is between about 7 mm and about 12 mm.

Clause 46. The device of clause 37, wherein the permeable shell is configured to assume an expanded state after deployment into the patient's cerebral aneurysm, wherein a shape of the expanded state is different than a shape of the expanded preset configuration.

Clause 47. A method for treating a cerebral aneurysm having an interior cavity and a neck, comprising the steps of:
advancing an implant in a microcatheter to a region of interest in a cerebral artery, wherein the implant comprises:
a permeable shell having a plurality of elongate filaments that are woven together to form a mesh, the permeable shell having a first end, a second end, a radially constrained elongated configuration for delivery within a catheter lumen, and an expanded preset configuration with a longitudinally shortened configuration relative to the radially constrained state, wherein in the expanded preset configuration, a diameter of the first end is smaller than a diameter of the second end;

deploying the implant within the cerebral aneurysm, wherein the permeable shell expands to an expanded state in the interior cavity of the aneurysm, wherein the expanded state is different from the expanded preset configuration; and withdrawing the microcatheter from the region of interest after deploying the implant.

Clause 48. The method of clause 47, wherein the expanded preset configuration has a frustoconical shape.

Clause 49. The method of clause 47, wherein the expanded preset configuration has a cross-sectional shape of a trapezoid.

Clause 50. The method of clause 47, wherein a shape of the expanded preset configuration is different than a shape of the expanded state.

Clause 51. The method of clause 47, wherein the expanded state in the interior cavity has a height that is longer than a height of the expanded preset configuration.

Clause 52. The method of clause 47, wherein the expanded state in the interior cavity has a diameter that is smaller than the diameter of the second end in the expanded preset configuration.

Clause 53. The method of clause 47, wherein the first end is the proximal end and the second end is the distal end.

Clause 54. The method of clause 47, wherein the first end is the distal end and the second end is the proximal end.

Clause 55. The method of clause 47, wherein the difference between the diameter of the second end and the diameter of the first end in the expanded preset configuration is between about 1.0 mm to about 5.0 mm.

Clause 56. The method of clause 47, wherein a ratio of the diameter of the first end to the diameter of the second end may is between about 1:2 to about 1:6.

Clause 57. The method of clause 47, wherein the diameter of the first end is between about 4 mm and about 7 mm.

Clause 58. The method of clause 47, wherein the diameter of the second end is between about 7 mm and about 12 mm.

Clause 59. A device for treatment of a patient's cerebral aneurysm, comprising:
  a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and
  an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening,
  wherein the outer skirt is coupled to the permeable shell at at least one node.

Clause 60. The device of clause 59, wherein the distal edge of the outer skirt is not coupled to the permeable shell.

Clause 61. The device of clause 59, wherein the at least one node is located at or near the proximal edge of the outer skirt.

Clause 62. The device of clause 59, wherein the at least one node is a suture or a stitch.

Clause 63. The device of clause 59, wherein the at least one node couples the outer skirt and the permeable shell with adhesive.

Clause 64. The device of clause 59, wherein the outer skirt is coupled to an outer surface of the permeable shell at the at least one node.

Clause 65. The device of clause 59, wherein the at least one node is located in a proximal region of the permeable shell.

Clause 66. The device of clause 59, wherein the outer skirt is configured to bulge radially outwardly during radial expansion of the permeable shell to the expanded state.

Clause 67. The device of clause 59, wherein the at least one node is located at the proximal end of the permeable shell.

Clause 68. The device of clause 59, wherein the outer skirt comprises polyethylene terephthalate.

Clause 69. The device of clause 59, wherein each of the plurality of elongate filaments have a proximal and distal end, wherein the proximal ends of the plurality of filaments are gathered in a proximal hub, and wherein the proximal edge of the outer skirt surrounds the proximal hub.

Clause 70. The device of clause 69, wherein the proximal hub is a proximal marker band.

Clause 71. The device of clause 69, wherein the distal ends of the plurality of filaments are gathered in a distal hub.

Clause 72. The device of clause 71, wherein the distal hub is a distal marker band.

Clause 73. The device of clause 59, further comprising a pusher wire detachably coupled to the proximal end of the permeable shell.

Clause 74. A method for treating a cerebral aneurysm having an interior cavity and a neck, comprising the steps of:
  advancing an implant in a microcatheter to a region of interest in a cerebral artery, wherein the implant comprises:
    a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and
    an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening,
    wherein the outer skirt is coupled to the permeable shell at at least one node;
  deploying the implant within the cerebral aneurysm, wherein the permeable shell expands to its expanded state in the interior cavity of the aneurysm, wherein the outer skirt fills a gap between the permeable shell and a wall of the cerebral aneurysm; and
  withdrawing the microcatheter from the region of interest after deploying the implant.

Clause 75. The method of clause 74, wherein the outer skirt fills a gap between the permeable shell and the wall of the cerebral aneurysm near a neck of the aneurysm.

Clause 76. The method of clause 74, wherein the distal edge of the outer skirt is not coupled to the permeable shell.

Clause 77. The method of clause 74, wherein the at least one node is located at or near the proximal edge of the outer skirt.

Clause 78. The method of clause 74, wherein the at least one node is a suture or a stitch.

Clause 79. The method of clause 74, wherein the at least one node couples the outer skirt and the permeable shell with adhesive.

Clause 80. The method of clause 74, wherein the outer skirt is coupled to an outer surface of the permeable shell at the at least one node.

Clause 81. The method of clause 74, wherein the at least one node is located in a proximal region of the permeable shell.

Clause 82. The method of clause 74, wherein the outer skirt is configured to bulge radially outwardly during radial expansion of the permeable shell to the expanded state.

Clause 83. The method of clause 74, wherein the at least one node is located at the proximal end of the permeable shell.

Clause 84. The method of clause 74, wherein the outer skirt comprises polyethylene terephthalate.

Clause 85. The method of clause 74, wherein each of the plurality of elongate filaments have a proximal and distal end, wherein the proximal ends of the plurality of filaments are gathered in a proximal hub, and wherein the proximal edge of the outer skirt surrounds the proximal hub.

Clause 86. The method of clause 85, wherein the proximal hub is a proximal marker band.

Clause 87. The method of clause 85, wherein the distal ends of the plurality of filaments are gathered in a distal hub.

Clause 88. The method of clause 87, wherein the distal hub is a distal marker band.

Clause 89. The method of clause 74, further comprising a pusher wire, wherein the pusher wire detachably coupled to the proximal end of the permeable shell, wherein the method further comprises the step of detaching the implant from the pusher wire before the step of withdrawing the microcatheter from the region of interest.

Clause 90. The method of clause 89, further comprising the step of withdrawing the pusher wire from the region of interest through the microcatheter.

Clause 91. A method for treating a cerebral aneurysm having an interior cavity and a neck, comprising the steps of:

advancing an implant in a microcatheter to a region of interest in a cerebral artery, wherein the implant comprises:

a permeable shell having a proximal end, a distal end, an outer surface, a radially constrained elongated state configured for delivery within a catheter lumen, an expanded state with a longitudinally shortened configuration relative to the radially constrained state, and a plurality of elongate filaments that are woven together to form a mesh, and an outer skirt having a proximal opening defined by a proximal edge, a distal opening defined by a distal edge, and an intermediate portion between the proximal and distal edges of the outer skirt, wherein a perimeter of the proximal opening is smaller than a perimeter of the distal opening, wherein the outer skirt is coupled to the permeable shell at at least one node, and wherein the proximal end of the permeable shell is detachably coupled to a pusher wire;

deploying the implant within the cerebral aneurysm, wherein the permeable shell expands to its expanded state in the interior cavity of the aneurysm, wherein the outer skirt fills a gap between the permeable shell and a wall of the cerebral aneurysm;

detaching the implant from the pusher wire, and withdrawing the pusher wire from the region of interest through the microcatheter after deploying the implant.

What is claimed:

1. A device for treatment of a patient's cerebral aneurysm, comprising:

a permeable shell having a proximal end, a distal end, an outer surface, an inner surface, a radially constrained elongated state configured for delivery within a catheter lumen, an expanded state with a longitudinally shortened configuration relative to the radially constrained state, and a plurality of elongate filaments that are woven together to form a mesh, the expanded state having an exterior cavity defined by the outer surface of the permeable shell, wherein the exterior cavity comprises an opening communicating with a chamber, wherein the opening is narrower than a length of the chamber, wherein a maximum length of the opening is smaller than a maximum length of the chamber; and an additional embolic material deployed in the chamber of the cavity, wherein the additional embolic material comprises one or more coils.

2. The device of claim 1, wherein the exterior cavity is located at the proximal end of the permeable shell.

3. The device of claim 1, wherein the maximum length of the opening is a diameter of the opening.

4. The device of claim 1, further comprising a proximal hub attached to a proximal end of the permeable shell.

5. The device of claim 4, wherein the proximal hub is located in the chamber of the exterior cavity.

6. The device of claim 4, wherein the proximal hub is coupled to a pusher.

7. The device of claim 1, wherein the one or more coils is coupled to a proximal end of the proximal hub of the implant.

8. The device of claim 1, wherein the maximum length of the opening is a diameter of the opening and the maximum length of the chamber is a diameter of the chamber.

* * * * *